US012626596B2

(12) United States Patent
Segesten

(10) Patent No.: US 12,626,596 B2
(45) Date of Patent: May 12, 2026

(54) SYSTEMS AND METHODS FOR INCREASING AWARENESS OF UNEXPECTED VULNERABLE ROAD USERS

(71) Applicant: Volvo Car Corporation, Gothenburg (SE)

(72) Inventor: Henrik Segesten, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 18/812,081

(22) Filed: Aug. 22, 2024

(65) Prior Publication Data

US 2026/0057774 A1 Feb. 26, 2026

(51) Int. Cl.
*G08G 1/16* (2006.01)

(52) U.S. Cl.
CPC ............. *G08G 1/166* (2013.01); *G08G 1/161* (2013.01)

(58) Field of Classification Search
CPC ............................... G08G 1/166; G08G 1/161
See application file for complete search history.

(56) References Cited

U.S. PATENT DOCUMENTS

| | | | | |
|---|---|---|---|---|
| 2019/0351896 | A1 | 11/2019 | Solmaz et al. | |
| 2023/0186770 | A1 | 6/2023 | Fowe et al. | |
| 2023/0196908 | A1 * | 6/2023 | Beaurepaire | G06V 20/58 701/117 |
| 2023/0249712 | A1 * | 8/2023 | Chen | G06V 20/58 701/26 |
| 2024/0046794 | A1 * | 2/2024 | Simon | G08G 1/0133 |

OTHER PUBLICATIONS

Gelbal, et al., "Vulnerable Road User Safety Using Mobile Phones with Vehicle-to-VRU Communication," Electronics 2024, 13, 331. https://doi.org/10.3390/electronics13020331. Published: Jan. 12, 2024.

* cited by examiner

*Primary Examiner* — Harry Y Oh
(74) *Attorney, Agent, or Firm* — Amin, Turocy & Watson, LLP

(57) ABSTRACT

Techniques for increasing awareness regarding unexpected vulnerable road users (VRUs) within an environment of a vehicle are provided. An example method comprises detecting, by a system onboard a vehicle and comprising a processor, a vulnerable road user (VRU) located within an environment of the vehicle. The method further comprises determining, by the system, a probability representative of a degree to which the VRU is expected to be located within the environment, and rendering, by the system, notification data regarding the VRU via an electronic output device located on or within the vehicle based on the probability being below a threshold probability.

20 Claims, 11 Drawing Sheets

600

SYSTEMS AND METHODS FOR INCREASING AWARENESS OF UNEXPECTED VULNERABLE ROAD USERS

TECHNICAL FIELD

The disclosed subject matter relates to vehicles (e.g., transportation vehicles), and more particularly, to systems and methods for increasing awareness of unexpected vulnerable road users.

BACKGROUND

The term "vulnerable road user" (VRU) is used in the automative industry to refer to an individual who is at a higher risk of injury or fatality in traffic accidents due to their lack of protection compared to motor vehicle occupants. Vulnerable road users (VRUs) include many types of less protected traffic participants, such as pedestrians, cyclists, motorcyclists, various forms of powered two-wheelers, and persons with disabilities or reduced mobility and orientation. In urban or built-up environments these types of traffic participants are expected and thus various measures tailored to such environments are typically implemented to protect VRUs, such as dedicated infrastructure improvements (e.g., dedicated bike lanes, pedestrian paths, crosswalks, pedestrian signals, traffic calming measures, protected intersections, enhanced street lighting and visibility indicators, etc.) and policy/regulation measures (e.g., reduced speed limits, increased penalties for traffic violations that endanger VRUs, zoning laws, etc.). However, in rural areas these types of traffic participants are usually not expected and their sudden appearance in many cases leads to dangerous situations or bad driving.

The above-described background relating to issues associated with VRUs is merely intended to provide a contextual overview of some current issues and is not intended to be exhaustive. Other contextual information may become further apparent upon review of the following detailed description.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, systems, devices, computer-implemented methods, apparatuses and/or computer program products are described that facilitate increasing awareness of unexpected VRUs.

As alluded to above, techniques for protecting VRUs from being involved in traffic incidents in environments where they are not expected are desirable, and various embodiments are described herein to this end and/or other ends.

According to an embodiment, a system onboard a vehicle can comprise a memory that stores computer-executable components, and a processor that executes the computer-executable components stored in the memory. The computer-executable components include a detection component that detects a VRU located within an environment of the vehicle, and an assessment component that determines a probability representative of a degree to which the VRU is expected to be located within the environment, and a notification component that renders notification data regarding the VRU via an electronic output device located on or within the vehicle based on the probability being below a threshold probability.

In some implementations, the VRU assessment component classifies the VRU as being unexpected as opposed to expected based on the probability being below the threshold probability, and wherein the notification component prevents rendering notifications regarding VRUs detected by the detection component that are classified as expected by the VRU assessment component. The notification data can also identify the VRU as being classified as unexpected.

In various implementations, the VRU assessment component determines VRU information regarding a location of the VRU, a type of the VRU and a trajectory of the VRU, and wherein the notification data comprises the VRU information. In some embodiments, the computer-executable components can further comprise a tracking component that tracks unexpected VRU information regarding VRUs detected within the environment and classified as unexpected, wherein the unexpected VRU information comprises the VRU information.

In some implementations, the notification component can also notify one or more other vehicles located within the environment regarding the VRU based on the probability being below the threshold probability (e.g., using vehicle to vehicle (V2V) communication technologies and/or vehicle to everything (V2X) communication technologies).

In one or more embodiments, the VRU assessment component determines the probability based on classification information associated with the environment indicating the probability. In some implementations wherein the environment comprises a road via which the vehicle is currently being driven, the VRU assessment component determines the probability based on classification information associated with the road indicating the probability. The VRU assessment component further determines the probability based on a type of the VRU and a time at which the VRU is detected by the detection component. In some implementations, the VRU assessment component further determines a measure of likelihood of the vehicle intersecting with the VRU based on a position of the VRU relative to the vehicle, a vehicle trajectory of the vehicle, and a VRU trajectory of the VRU, and wherein the notification component renders the notification data based on the measure being above a threshold measure.

In some embodiments, elements described in connection with the disclosed systems can be embodied in different forms such as a computer-implemented method, a computer program product, or another form.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It will be understood that when an element is referred to as being "coupled" to another element (and/or "connected" to another element or variations thereof), it can describe one or more different types of coupling including, but not limited to, chemical coupling, communicative coupling, capacitive coupling, electrical coupling, electromagnetic coupling, inductive coupling, operative coupling, conductive coupling, acoustic coupling, ultrasound coupling, optical coupling, physical coupling, thermal coupling, and/or another type of coupling. As referenced herein, an "entity" can comprise a human, a client, a user, a computing device, a software application, an agent, a machine learning model, an artificial intelligence, and/or another entity. It should be appreciated that such an entity can facilitate implementation of the subject disclosure in accordance with one or more embodiments described herein.

Figure 1:
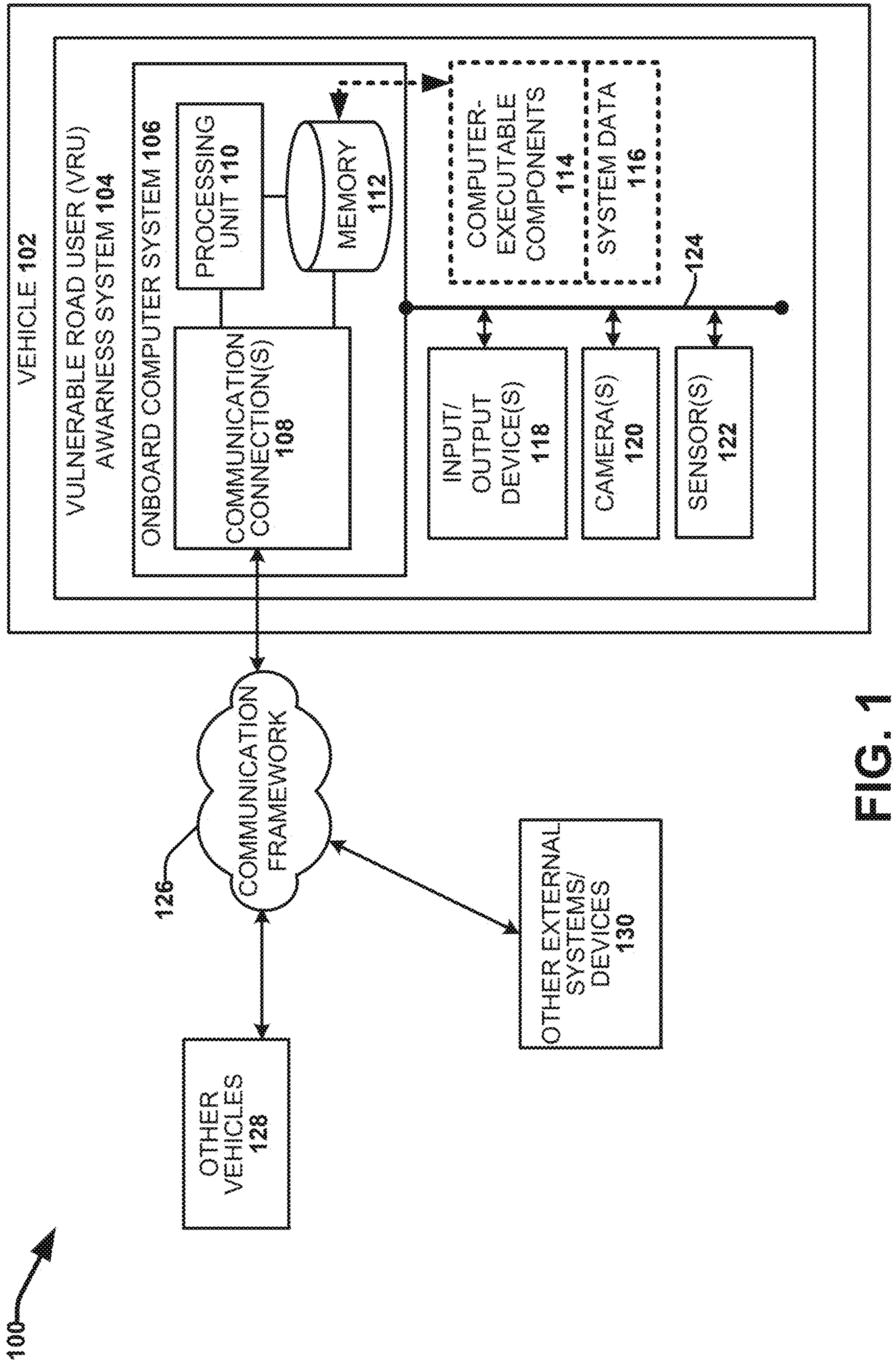
FIG. 1 illustrates a block diagram of an exemplary system that facilitates increasing awareness of unexpected VRUs, in accordance with one or more embodiments described herein.

Turning now to the drawings, FIG. 1 illustrates a block diagram of an exemplary system 100 system that facilitates increasing awareness of unexpected VRUs, in accordance with one or more embodiments. System 100 comprises vehicle 102, and (optionally) other vehicles 128 and other external systems/devices 130. System 100 further includes a communication framework 126 that communicatively couples the vehicle 102, the other vehicles 128 and other the external systems/devices 130 to one another. Communication framework 126 can include or correspond to any suitable wired or wireless communication framework (e.g., a global communication framework, a local communication framework, etc.) that enables wired and/or wireless communication between the respective systems/devices using any existing or future wired or wireless communication technologies. For example, communication framework 126 can enable communication between vehicle 102, other vehicles 128 and/or other external systems/devices using V2V communication technologies and V2X communication technologies such as but not limited to: Dedicated Short-Range Communications (DSRC). ITS-G5, Bluetooth, cellular (e.g., 3G, 4G, 5G, etc.), Wireless fidelity (Wi-Fi))); satellite communication technologies, and so on.

Vehicle 102 (and the one or more other vehicles 128) can correspond to any type of transportation vehicle. For instance, vehicle 102 can include or correspond to any type of motor vehicle (e.g., a car, a truck, a van, a sport utility vehicle (SUV), etc.). In some embodiments, vehicle 102 can include or correspond to an autonomous vehicle or a semi-autonomous vehicle. An autonomous vehicle, also known as a self-driving car or driverless car, is a vehicle capable of navigating and operating without direct human input using a combination of sensors, cameras, radar, lidar, GPS, and advanced software algorithms to perceive their environment, make decisions, and control their movement. The Society of Automotive Engineers (SAE) has defined six levels of automation for vehicles, ranging from Level 0 (no automation) to Level 5 (full automation). Level 5 autonomy refers to vehicles that can operate in all conditions without any human intervention, while lower levels of autonomy require varying degrees of human input or supervision. In this regard, in some embodiments, vehicle 102 can operate in different modes including an autonomous driving mode (e.g., corresponding to Level 5), a no automation mode (e.g., corresponding to Level 0), and a semi-autonomous driving mode (e.g., corresponding to any level between Level 0 and Level 5).

Vehicle 102 includes a VRU awareness system 104 that facilitates detecting unexpected VRUs and notifying a driver of the vehicle 102 and other vehicles 128 regarding the unexpected VRU. The VRU awareness system 104 can also receive notifications from other vehicles 128 employing a VRU awareness system corresponding to VRU awareness system 104 regarding unexpected VRUs detected by the other vehicles 128. As used herein the term vulnerable road user (VRU) is used to refer an entity who is at a higher risk of injury or fatality in traffic accidents due to their lack of protection compared to motor vehicle occupants. A VRU can include many types of less protected traffic participants, such as pedestrians, cyclists, equestrians (e.g., horseback riders, horse-drawn carriages, etc.), motorcyclists, various forms of motorized vehicles with occupants/divers exposed to the external environment (e.g., operated two-wheelers, operated four-wheelers, operated golf-carts, operated motorized scooters, operated segways/ninebots, and the like), and persons with disabilities or reduced mobility and orientation.

In urban or built-up environments these types of traffic participants are expected and thus various measures tailored to such environments are typically implemented to protect VRUs, such as dedicated infrastructure improvements (e.g., dedicated bike lanes, pedestrian paths, crosswalks, pedestrian signals, traffic calming measures, protected intersections, enhanced street lighting and visibility indicators, etc.) and policy/regulation measures (e.g., reduced speed limits, increased penalties for traffic violations that endanger VRUs, zoning laws, etc.). However, in rural areas these types of traffic participants are usually not expected and their sudden appearance in many cases leads to dangerous situations or bad driving. To this end, the VRU awareness system 104 is particularly configured to facilitate detecting VRUs in environments in which VRUs are less expected as compared to urban environments, such as rural areas and other environments where dedicated infrastructure improvements tailored to protect VRUs are generally not in place.

The VRU awareness system 104 addresses this problem by using advanced vehicle camera and sensor systems (e.g., one or more cameras 120 and one or more sensors 122) and classification algorithms (based on machine learning) that can find VRUs in such environments and reliably determine their type, their location relative to the vehicle 102, their trajectory and probability of intersection with the vehicle (e.g., whether they are in the path of the vehicle and not on a parallel road or pathway) and generate high quality information on unexpected VRUs. The VRU awareness system 104 further utilizes known or learned information about the environment of the vehicle 102 indicating a degree to which VRUs are expected to be located within the environment to classify detected VRUs as being expected or unexpected. For example, the information about the environment can include road map classification information that assigns classifiers to respective roads and/or portions thereof representative of a probability to which VRUs are expected to be located on the respective roads and/or the portions thereof. The VRU awareness system 104 further generates and renders notification data regarding detected unexpected VRUs to the driver of the vehicle (e.g., visual notification data rendered via a graphical display located on or within the vehicle, audible notification data rendered via a speaker of the vehicle, or the like). In addition, the VRU awareness system 104 can communicate information regarding detected unexpected VRUs with other vehicles within or near the area of the vehicle (e.g., using V2V communication technologies, V2X communication technologies and the like) to provide visual and/or audible alerts to other drivers. These notifications or alerts create awareness about the unexpected VRUs in the area, giving time to adjust driving behavior and thus reducing the number of dangerous situations as well as providing an increased sense of the vehicle 102 being aware of its surroundings.

To facilitate this end, the VRU awareness system 104 of the vehicle 102 includes or otherwise employs one more cameras 120 and one or more sensors 126 integrated on or within the vehicle 102 that capture image and sensor data of the external environment of the vehicle 102. The image and sensor data is further processed by an onboard computer system 106 of the vehicle 102 using various advanced hybrid image data analysis and sensor data analysis algorithms (e.g., based on machine learning) to detect and determine information about VRUs in the environment of the vehicle (e.g., VRU type, relative position to the vehicle, trajectory, etc.).

In this regard, the onboard computer system 106 comprises at least one memory 112 that stores computer-executable components 114 and system data 116 that facilitate various features and functionalities related to detecting unexpected VRUs and notifying the vehicle 102 and other vehicle 128 (or more particularly respective drivers thereof) regarding the unexpected VRUs. The onboard computer system 106 includes at least one processor or processing unit 110 that executes the computer-executable components 114 stored in memory 112 to carry out the operations/functions described with respect to the corresponding computer-executable components. The computer-executable components 114 and system data 116 are described in detail with reference to FIGS. 2 and 5. Examples of said memory 112, processing unit 110, and other computer system components that can be included in the onboard computer system 106 to facilitate the various features and functionalities of system 100 can be found with reference to FIG. 10 (e.g., system memory 1010, processing unit 1004, and the like).

The onboard computer system 106 can also include communication connections 108. Communication connections 108 refers to the hardware and software employed to connect the onboard computer system 106 to other vehicles 128 and other external systems/devices 130 via communication framework 126. Any suitable wired and/or wireless technology can be utilized by the communication connections 106 to enable communication of information between the onboard computer system 104 and other vehicles 128 and/or other external systems and devices 130. Suitable technologies include BLUETOOTH®, cellular technology (e.g., 3G, 4G, 5G), internet technology, ethernet technology, ultra-wideband (UWB), DECAWAVE®, IEEE 802.15.4a standard-based technology, Wi-Fi technology, Radio Frequency Identification (RFID), Near Field Communication (NFC) radio technology, and the like.

The VRU awareness system 104 can also include one or more input/output devices 118 located on or within the vehicle 102. The input/output devices 118 can include any suitable input device that provides for receiving user input in association with utilizing the various features and functionalities of the onboard computer system 106 and any suitable output device that provides for rendering information to users (e.g., notification data regarding detected unexpected VRUs). For example, the input/output devices 118 can include any suitable electronic output device such as a display, a speaker, a haptic feedback device, etc. and any suitable electronic input device, such as a touchscreen display, a microphone, a keypad, a keyboard, a camera, and the like. Examples of suitable input and output devices are further provided with reference to FIG. 10 (and input devices 1028 and output device 1036). The data VRU awareness system 104 can also include a system bus 124 that couples the respective components thereof (e.g., the onboard computer system 106, the input/output devices 118 and the one or more cameras 120 and the one or more sensors 122) to one another using any suitable wired or wireless communication technology.

Figure 2:
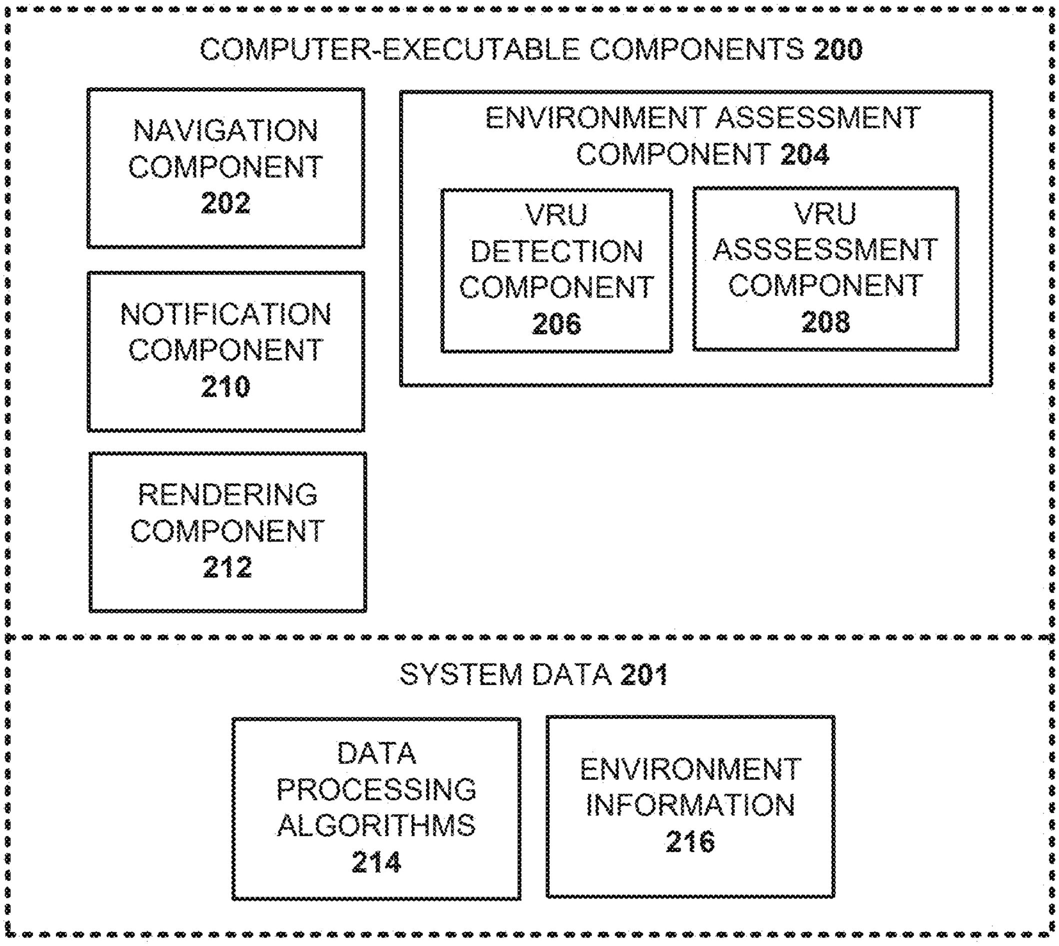
FIG. 2 illustrates example computer-executable components that facilitate increasing awareness of unexpected VRUs, in accordance with one or more embodiments described herein.

FIG. 2 illustrates a block diagram of example computer-executable components 200 and data 201 that facilitate various features and functionalities of the VRU awareness system 104, in accordance with one or more embodiments described herein. With reference to FIGS. 1 and 2, computer-executable components 200 and data 201 can correspond to computer-executable components 114 and data 116 respectively. In one or more embodiments, computer-executable components 200 can include (but are not limited to), navigation component 202, environment assessment component 204, notification component 210 and rendering component 212, and system data 201 can include data processing algorithms 214 and environment information 216.

Navigation component 202 can include or correspond to any suitable navigation system or navigation application configured to determine and track location data regarding the location of the vehicle 102 using any suitable location detection technology. For example, the location detection technology can include (but is not limited to), global positioning system (GPS) technology, cellular triangulation technology, Wi-Fi positioning system (WPS) technology, Bluetooth low energy (BLE) beacon technology, radio frequency identification (RFID) technology, internal measurement unit (IMU) technology, ultrawideband (UWB) technology, acoustic-based location detection technology, and combinations thereof. In some embodiments, (as reflected in FIG. 2), the navigation component 202 can include or correspond to an onboard navigation system that is executed by the onboard computer system 106. In other embodiments, the navigation component 202 can include or correspond to a navigation application executed by an auxiliary device that is communicatively connected to the onboard computer system 106 (e.g., a smartphone or a similar device). The navigation component 202 can provide various features and functionalities of existing and future vehicle navigation systems, including real-time location and route tracking, provision of digital maps (e.g., detailed maps of roads, highways, streets, points of interest, etc.), turn-by-turn directions, route planning, and real-time traffic information.

The environment assessment component 204 can assess and make determinations and inferences about the physical environment external to the vehicle in association with characterizing the environment and detecting and characterizing unexpected VRU. To facilitate this end, the environment assessment component 204 analyzes image data and sensor data captured via the one or more cameras 120 and the one or more sensors 122 using various data processing algorithms 214 configured to generate information about the environment. For example, the environment assessment component 204 process the image and sensor data using various data processing algorithms (e.g., machine learning algorithms, statistical algorithms and/or the like) to determine information regarding objects external to the vehicle, including type of the objects, size of the objects, relative position of the vehicle to the objects, and movement patterns of the objects. In this regard, the objects can include any type of object or thing external to the vehicle, including VRUs and other fixed and mobile objects, things, man-made objects (e.g., physical structures, roads, paths, sidewalks, other vehicle, lane markings, signs, etc.), natural objects (e.g., landscapes, trees, fields, mountains, etc.), animals and so on.

The environment assessment component 204 can further include VRU detection component 206 that is particularly configured to detect and classify VRUs located within the vehicle's current environment (e.g., as detected from image and/or sensor data captured from the current environment) using one or more data processing algorithms 214 tailored to this task. The environment assessment component 204 further include a VRU assessment component 208 that further determines additional information about any detected VRUs based on further analysis of the image and/or sensor data from which the VRU was detected (using one or more additional data processing algorithms 214 tailored to perform the additional analysis) and using environment information 216 that provides known or learned information about the environment within which the VRU was detected. As discussed in greater detail below, such additional information can include an expectedness probability representative of a degree to which the VRU is expected to be located within the environment and an intersection probability providing a measure of likelihood of the vehicle and the VRU intersecting (e.g., based on the location of the VRU in the environment, the trajectory or path of the VRU, information regarding physical structures and/or barriers associated with the path trajectory or path of the VUR, the relative position of the vehicle to the VRU, and the trajectory of the VRU).

The notification component 210 can further generate notification data regarding unexpected VRUs detected by the VRU detection component 206 and the rendering component 212 can render the notification data via a suitable electronic output device located on or within the vehicle 102. The purpose of the notification data is to alert the driver of the vehicle 102 regarding unexpected VRUs detected within or near the environment of the vehicle 102 so that the driver can proceed to operate the vehicle 102 with caution in association with safely avoiding a collision with the VRU. For example, in some embodiments, the notification data can include visual notification data that can be rendered via center console display of the vehicle 102 or another electronic display device located on or within the vehicle 102 capable of being safely viewed by the driver of the vehicle (e.g., a dashboard display, a head-up display, a wearable display device worn by the driver, a windshield display, an augmented reality display device, and the like). The visual notification data can include visual information (e.g., text, symbols, image data, etc.) that indicates an unexpected VRU has been detected within the environment of the vehicle 102. In some embodiments, the visual notification data can also provide a visual indication of the type of the unexpected VRU, the relative position of unexpected VRU to the vehicle, the location of the VRU in the environment, and the trajectory of the VRU. In some embodiments, the notification data can also indicate the expectedness probability, the intersection probability and/or information indicating how and when the vehicle may potentially intersect with the unexpected VRU. The notification data can additionally or alternatively include audible data (e.g., rendered via a speaker located on or within the vehicle) and/or haptic feedback output data (e.g., rendered via a haptic feedback device located on or within the vehicle) providing same or similar information as the visual notification data described above (and further described below).

To this end, the one more cameras 120 can include any type of camera located on or within the vehicle 102 that provides a perspective of the external environment of the vehicle 102 and configured to capture image data (e.g., still image data and/or video data) of the external environment. In preferred embodiments, the one or more cameras collectively provide a 360-degree view of the external environment of the vehicle and are configured to continuously capture high resolution video data of the external environment. For example, the one or more cameras 120 can include front, rear and side cameras of the vehicle 102. Additionally, or alternatively, the one or more cameras 120 can include a 360-degree camera mounted on or near the roof of the vehicle that provides a birds-eye view around the vehicle. In another example, the one or more cameras 120 can include one more stereo cameras that capture three-dimensional (3D) images of the external environment that can be used to determine the size and relative position (e.g., distance and orientation) to the vehicle of VRUs and other external objects.

The one or more sensors 122 can include various types of sensors that can collect sensor data that can be used to assess the external environment and context of the vehicle (e.g., location, speed, trajectory, information about the environment, etc.), such as sensor data that indicates the size and relative position (e.g., distance and orientation) to the vehicle of VRUs and other external objects, characteristics of the external objects, movement patterns of the vehicle and the external objects, and the like. In this regard, the one or more sensors 126 can include (but are not limited) to, acoustic sensors (e.g., microphones), laser sensors, Light Detection and Ranging (LiDAR) sensors, sonar sensors, audiovisual sensors, perception sensors, motion detectors, proximity sensory, velocity sensors, and the like. Additional examples of the one or more sensors 126 can include (but are not limited to) distance sensors, seats, seat position sensor(s), collision sensor(s), odometers, altimeters, speedometers, accelerometers, vibration meters, moisture sensors, thermometers, seatbelt sensors, wheel speed sensors, a combination thereof, and/or the like.

For example, the one or more sensors 122 can include radio detection and ranging (radar) sensors, including short-range radar that provides for detecting and characterizing external objects and VRUs at low vehicle speeds, as well as long-range radar sensors that provides for detecting and characterizing external objects and VRUs at higher speeds. The one or more sensors 122 can also include LiDAR sensors that use laser beams to create a detailed 3D map of the vehicle's surroundings. The one or more sensors 122 can also include ultrasonic sensors that emit ultrasonic waves and measure the time it takes for the echo to return in association with detecting the relative position of the vehicle to external objects and VRUs. The one or more sensors 122 can also include infrared sensors that detect heat signatures from external objects and VRUs that can be used to determine information regarding relative position and type of the external objects and the VRUs.

In various embodiments, the environment assessment component 204 can receive and process image data and sensor data captured by the respective cameras 120 and sensors 124 in real-time using various data processing algorithms 214 to detect VRUs within the current environment of the vehicle 102 and to determine information about the VRUs, such as VRU type (e.g., pedestrian, type of pedestrian, cyclist, motorcyclist, horseback rider, segway rider, golf cart, scooterist, etc.), relative position of the VRU to the vehicle, trajectory of the VRU, and probability of the VRU intersecting with the vehicle 102. For example, in various embodiments, the data processing algorithms 214 can include one or more object detection and classification algorithms configured to detect and classify objects and VRUs depicted in image data captured of the external environment of the vehicle 102 in real-time or substantially real-time. The object detection and classification algorithms can include various types of machine learning algorithms tailored to perform such image data-based object recognition tasks using convolutional neural networks (CNNs) and other types of machine learning architectures/models trained on large image data sets to recognized and classify various types of objects and VRUs. Generally, such object detection algorithms involve scanning the image data with a window that checks for defined object/VRU features at various scales and positions.

With respect to detecting and classifying VRUs detected in the image data, in some embodiments, the VRU detection component 206 can employ one VRU detection algorithms (e.g., included amongst the data processing algorithms 214) configured to regularly or continuously process image data captured of the external environment of the vehicle via the one or more cameras 120 to identify regions in the image data that likely contain a VRU and extract relevant features (e.g., edges, textures) from the proposed region. The VRU detection algorithms can further include a classifier, another trained machine learning model (e.g., a support vector machine, a decision tree, a neural-network, etc.), that can further take the extracted features and determine whether the region contains a VRU and the type of the VRU. In this regard, the type of the VRU can reflect a plurality of different defined VRU type classifications, such as but not limited to, pedestrian, walking pedestrian, jogging pedestrian, skateboarding pedestrian, roller blading pedestrian, cyclist, motorcyclist, segway rider/driver, scooter rider/driver, golf-cart rider/driver, horseback rider, horse drawn carriage rider/driver and so on. To this end, the one or more VRU detection algorithms can include one or more trained machine learning models (e.g., CNNs and/or other types of neural network models) trained on a large dataset of different images depicted the different types of VRUs in various environments and forms.

The VRU detection component 206 can also employ non-image sensor data captured via one or more sensors 122 in association with detecting and classifying VRUs within the environment of the vehicle. In this regard, the VRU detection component 206 can process non-image sensor data, such as data from radar, lidar, ultrasonic sensors, and infrared sensors, using various sensor data processing algorithms included amongst can the data processing algorithms to detect and classify VRUs and other objects within the environment of the vehicle 102. To this end, radar sensor data and ultrasonic sensor data can provide information regarding distance, speed and movement of objects around the vehicle 102. Lidar sensor data measures the time it takes for laser beam reflections off surrounding objects, which can be processed via 3D mapping algorithms to create a 3D map of the vehicle surroundings. Infrared sensors detect heat signatures from objects and provide data on temperature variations. In various embodiments, the various forms of sensors data can be processed by the VRU detection component 206 using one or more machine learning algorithms (e.g., CNNs and other types of neural networks) to extract relevant features from the sensors data, such as radar features (e.g., information regarding distance of the vehicle to the respective objects, relative speed of the objects, angular position of the objects relative to the vehicle, lidar features (e.g., precise coordinates of objects in 3D space, surface normal, object reflectivity, etc.), ultrasonic features (e.g., precise distance of the vehicle to nearby objects, echo intensity indicating object type), and infrared features (e.g., heat signatures of object indicating object type, object shape and contour outlines determined based on thermal differences, etc.).

In various embodiments, the one more sensor data processing algorithms can combine data from multiple sensors to create a comprehensive view of the vehicle's environment (e.g., combining lidar point clouds with radar range and velocity data) in association with detecting objects within the environment of the vehicle. The VRU detection component 206 can also process the sensor data using clustering algorithms to detect objects around the vehicle, such as density-based spatial clustering of applications with noise (DBSCAN) algorithms which groups nearby point in lidar or radar data to identify distinct objects, and Euclidean clustering, which segments point clouds into clusters representing individual objects. The VRU detection component 204 can also employ one or more machine learning models (included amongst the data processing algorithms 214) tailored to perform object classification and classify different types of VRUs based on features extracted from the sensor data (e.g., random forest models, SVM models, and/or neural network models). For example, the one or more machine learning models can be configured to classify detected objects as being a VRU and the particular type of the VRU based the various radar, lidar, ultrasonic and infrared sensor data features described above in addition to and/or in combination with the image data based object detection and classification mechanisms discussed above. For example, in some embodiments, the one or more data processing algorithms 214 can include a multimodal machine learning model configured to extract features from different types of input data (e.g., image data, and different types of sensor data) and classify objects reflected in the input data based on the extracted features, including classifying different types of VRUs and other objects (e.g., roads, pathways adjacent to the vehicle, traffic intersections, traffic signs, natural objects, etc.).

In some embodiments, based on detecting a and type classifying a VRU from image data captured via the one or more cameras 120 and/or sensor data captured via the one or more sensors 122 by the VRU detection component 206, the VRU assessment component 208 further determines additional information about the detected VRU based on further analysis of the image and/or sensor data from which the VRU was detected (using one or more additional data processing algorithms 214 tailored to perform the additional analysis), and using environment information 216 that provides known or learned information about the environment within which the VRU was detected.

In various embodiments, the additional information includes an expectedness probability representative of a degree to which the detected VRU is expected to be located within the environment. To facilitate this end, the VRU assessment component 208 can employ environment information 216 that identifies or indicates the expectedness probability. For example, in some embodiments, the environment information 216 can include map data for various geographical areas and/or locations which further includes classifier information associated with the different geographical areas and/or locations indicating respective measures of likelihood of presence of VRUs on respective roads within the geographical areas. For instance, in some implementations, the respective measures of likelihood can include or correspond to environment type classifiers classifying the respective geographical areas or environments as being rural or urban. In accordance with this example, based on the environment within which the vehicle is located where a VRU is detected being urban, the VRU assessment component 208 can be configured to classify VRU as being expected. On the other hand, based on the environment being rural, the VRU assessment component 208 can be configured to classify the VRU as being unexpected.

In another example, the type classifiers for the respective environments can provide a more granular view of the degree to which the different geographical areas or environments are expected to include VRUs. For instance, as opposed to labeling the respective areas as being either urban or rural, the environment information 216 can include learned or inferred VRU expectedness probabilities corresponding to learned or inferred expectedness probabilities representative of the degree to which VRUs and/or respective types of VRUs are expected be present on respective roads and/or portions thereof, in the respective geographical areas (e.g., as learned based on historically tracked information regarding the number and frequency of different types of VRUs being present on the respective roads and/or portions thereof). For instance, in some implementations, respective roads and/or portions thereof can be associated with respective VRU expectedness probability values/measures that reflect respective degrees to which VRU are expected to travel along the roads, respective portions of the roads and/or cross the respective roads at defined locations along the roads. In some implementations, the expectedness probabilities included in the environment information 216 can also be tailored to different types of VRUs. For example, a particular segment of a particular road in a rural area may have different expectedness probabilities for different types of VRUs.

As noted above, in some embodiments, the expectedness probabilities for respective types of VRUs paired with different geographical areas, roads and/or portions thereof (e.g., segments of roads, and/or precise locations along the roads), can include learned information aggregated over time. In some embodiments, the VRU awareness systems 104 and other VRU awareness systems of other vehicles 128 can facilitate generating and updating the environment information 216 over time in a crowd-sourced manner, as discussed in greater detail with reference to FIG. 5. In this regard, as illustrated in FIG. 2, the environment information 216 can be stored in local memory onboard the vehicle 102 (e.g., memory 112) and accessed by the VRU assessment component locally. However, additionally, or alternatively, the environment information 216 can be stored at any suitable network accessible system or device (e.g., included amongst the other external systems/device 130) and accessed by the VRU assessment component 208 via any suitable wireless communication framework.

To this end, based on the current location and/or route of the vehicle 102 (e.g., as determined using navigation component 202), the VRU assessment component 208 can determine the corresponding expectedness probability (e.g., a probability measure, a score or another valuation measure) representative of a measure of expectedness of a detected VRU within the vehicle's current environment being present on the road (or portion thereof) traveled by the vehicle 102 as provided in the environment information 216. In some embodiments, the VRU assessment component 208 can further tailor (e.g., increase and decrease) the expectedness probability based on other contextual factors, such as time (e.g., time of day, day of week, day of year) and weather conditions. For example, in some embodiments, the respective expectedness probabilities paired with respective environments, roads, and/or portions thereof, can also include different measures tailored to different times and/or weather conditions. For instance, a particular segment of a road in a particular rural area may have a higher likelihood of VRUs and/or certain types of VRUs traveling along the road (or crossing the road) during the morning hours relative to the evening hours. In another example, the likelihood of VRUs and/or certain types of VRUs traveling along the road (or crossing the road) may decrease during rainy weather conditions. To this end, in some embodiments, the environment information 216 can define or indicate how an expectedness probability associated with a particular environment, road and/or portion thereof, should be increased or decreased as a function of various contextual factors, such as time, weather and other contextual factors.

In one or more embodiments, the notification component 210 can be configured to generate and render (e.g., via rendering component 212) notifications regarding detected VRUs based on the detected VRUs being considered or otherwise classified as unexpected. For example, in some embodiments, the notification component 210 can be configured to generate and render notification data via an electronic output device of the vehicle 102 regarding a detected VRU within the environment of the vehicle 102 based on the expectedness probability satisfying defined criteria, such as being below a threshold expectedness probability. In other words, in implementations in which the expectedness probability represents a probability to which the detected VRU is expected to be within current environment of the vehicle 102, the notification component 210 can be configured to render notification data regarding the detected VRU based on the expectedness probability being below a threshold probability. In some implementations of these embodiments, the threshold expectedness probability can vary for different geographical areas, roads and/or portions thereof and be defined in the environment information 216. In some embodiments, the VRU assessment component 208 can further classify detected VRU as being expected or unexpected based on the expectedness probability being below the threshold probability.

In some implementations of these embodiments, the notification component 210 can be configured to only generate and render notification data via an electronic output device of the vehicle 102 for detected VRUs classified as expected and prevent rendering of notification data regarding detected VRUs classified as expected. In this manner, the VRU awareness system 104 can minimize distractions to drivers regarding detected VRUs in areas/environments where VRUs are typically frequently encountered or otherwise expected. For instance, as can be appreciated in many urban environments traveled by vehicles, the vehicle may frequently encounter pedestrians, cyclists, and various other types of VRUs. Given the frequency of such encounters, generating and providing notifications to drivers of the vehicle regarding every VRU within the vicinity of the vehicle can become extremely distracting to the driver, causing the driver to potentially manually deactivate the VRU detection and notification system altogether or develop a habit of disregarding such notifications, which can become a serios issue when the vehicle travels out of the current environment where VRUs are expected into a new environment where VRUs are less frequently encountered. However, by restricting notifications regarding detected VRUs to those which are determined to be unexpected (by the VRU assessment component 208 in accordance with the mechanisms described above), the VRU awareness system 104 minimizes notification fatigue and assists the driver in becoming aware of VRUs in scenarios in which the driver would otherwise be less attentive towards VRUs.

In some embodiments, in addition to determining an expectedness probability for a detected VRU within the environment of the vehicle 102, the VRU assessment component 208 can also determine or infer an intersection probability regarding a measure of likelihood of the vehicle and the VRU intersecting with the detected VRU. In some implementations of these embodiments, the notification component 210 can be configured to only render notification data regarding a detected VRU within the environment traveled by the vehicle based on both the expectedness probability being below a threshold expectedness probability and the intersection probability being above a threshold intersection probability. For instance, in one example usage scenario, the vehicle 102 may be driving along portion of rural road where there is a bike path provided parallel to the road and the detected VRU is traveling along the bike path as opposed to the road. In accordance with this example, based on detecting a VRU located on the bike path as opposed to the road, the VRU assessment component 208 may determine the intersection probability is below the threshold intersection probability despite the VRU being classified as unexpected (in accordance with the techniques describe above), and the notification component 210 can prevent rendering a notification to the driver of the vehicle regarding the detected VRU.

The mechanism or mechanisms via which the VRU assessment component 208 determines or infers the intersection probability for a detected VRU within the environment of the vehicle 102 can vary. In various embodiments, the VRU assessment component 208 can determine or infer the intersection probability based on the relative position of the VRU to the vehicle 102 at the time at which the VRU is detected, the trajectory of the vehicle, and the trajectory of the VRU. To this end, the trajectory of the vehicle can account for the current position of the vehicle 102 at the time at which the VRU is detected, the direction of movement of the vehicle 102, the speed of the vehicle, and the route of the vehicle 102. Likewise, the trajectory of the VRU can account for the current position of the VRU at which the VRU is detected, the direction of movement of the VRU, the speed of the VRU, and the route of the vehicle VRU.

To facilitate this end, the VRU assessment component 208 can determine or infer the relative position of the VRU to the vehicle 102 at the time at which the VRU is detected, the trajectory of the vehicle, and the trajectory of the VRU based on analysis and/or processing of the image data and/or sensor data captured via the one or more cameras 120 and/or the one or more sensors 122. For instance, in furtherance to the example above involving the bike path, the VRU assessment component 208 can determine or infer that the VRU is traveling along the bike path as opposed to the road based using one or more image processing algorithms (e.g., included in the data processing algorithms 214) configured to detect and classify various types of environmental structures, such as bike paths, sidewalks, physical barriers, bridges, and the like. In some embodiments, the environment information 216 can also provide a detailed map of the environments defining roads, traffic patterns along the roads and other elements around the roads, such as bike paths, sidewalks, and the like, and the VRU assessment component 208 can also employ this information in association with determining or inferring characteristics of the trajectory of the VRU and the vehicle 102. The VRU assessment component 208 can also employ sensor data indicating the relative position of the VRU to the vehicle 102, the movement direction and speed of the vehicle and the movement direction and speed of the VRU in association with estimating the trajectories of the VRU and the vehicle 102.

To this end, the VRU assessment component 208 can determine the intersection probability as a function of whether and when the trajectories of the VRU and the vehicle 102 may intersect given their current relative positions and their respective trajectories. The VRU assessment component 208 can also account for known or inferred variations to the respective trajectories as a function of traffic conditions and potential random movement patterns of the vehicle and the VRU in association with determining or inferring the intersection probabilities. For example, the one or more data processing algorithms 214 can include one or more intersection probability estimation algorithms (e.g., machine learning algorithms such as one or more trained neural network models or the like) configured to estimate the intersection probability based on analysis of the image data and/or sensor data captured of the VRU and the environment of the vehicle 102 in which the VRU is detected (e.g., whether the VRU is traveling along the road or an alternative pathway parallel to the road) and the various features extracted from the image data and/or sensor data described above (e.g., characteristics of the environment, relative position data, relative speed data, VRU type, estimated trajectories, potential changes to the trajectories, road condition, traffic conditions, time of day, etc.). In accordance with this example, the VRU assessment component 208 can employ the one or more intersection probability algorithms to determine the intersection probability for a detected VRU. In some embodiments, in association with determining the intersection probability and the intersection probability being greater then a threshold intersection probability (e.g., greater than 1%, 10%, 30%, 50% or another defined threshold), the one or more intersection probability algorithms can also output information indicating the estimated trajectories of the VRU and the vehicle 102 and the time and manner in which they may intersect. In some embodiments, this information can be included in the notification data rendered to the driver of the vehicle.

Figure 3:
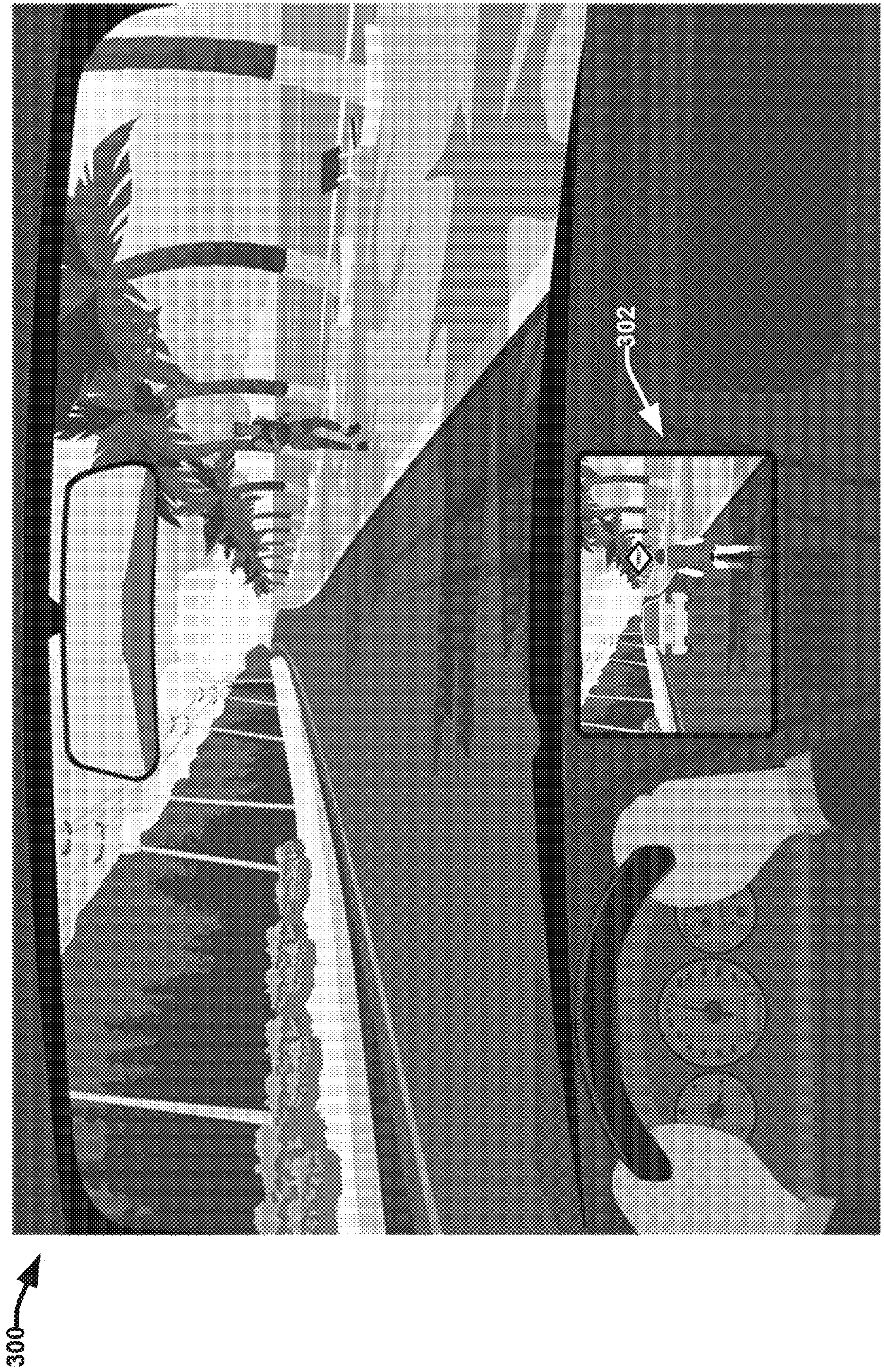
FIG. 3 illustrates an example usage scenario involving applications of a VRU awareness system onboard a vehicle in accordance with one or more embodiments described herein.

FIG. 3 illustrates an example usage scenario involving applications of VRU awareness system 104 in accordance with one or more embodiments described herein. With reference to FIG. 3 in view of FIGS. 1 and 2, FIG. 3 illustrates a driver's perspective 300 of the current environment of vehicle 102 through the front windshield of the vehicle 102. In accordance with this example, the vehicle 102 is being driven along a seaside road that has a pedestrian pathway along a portion of the road. In accordance with the illustrated usage scenario, two VRUs are present within the vicinity of the vehicle 102, a jogger positioned in front of the vehicle the vehicle 102 on the pedestrian pathway, and cyclist positioned behind the vehicle on the road. In this example, the VRU awareness system 104 has generated and rendered notification data (e.g., via notification component 210 and rendering component 212) regarding the detected cyclist behind the vehicle via a dashboard display 302 of the vehicle yet has prevented rending of notification data regarding the jogger. In this regard, in accordance with this example, the VRU detection component 206 can have detected both the cyclist and the jogger. However, the VRU assessment component 208 has determined that at either the jogger is an expected VRU and/or that the probability of intersection of the vehicle with the jogger is below the threshold intersection probability (in accordance with the techniques described above), and thus the notification component has prevented rendering notification data regarding the jogger. On the other hand, the VRU assessment component 208 has determined that the cyclist is an unexpected VRU and/or that the probability of intersection of the vehicle with the jogger is above the threshold probability, and thus the notification component 210 has rendered notification data regarding the cyclist.

Figure 4:
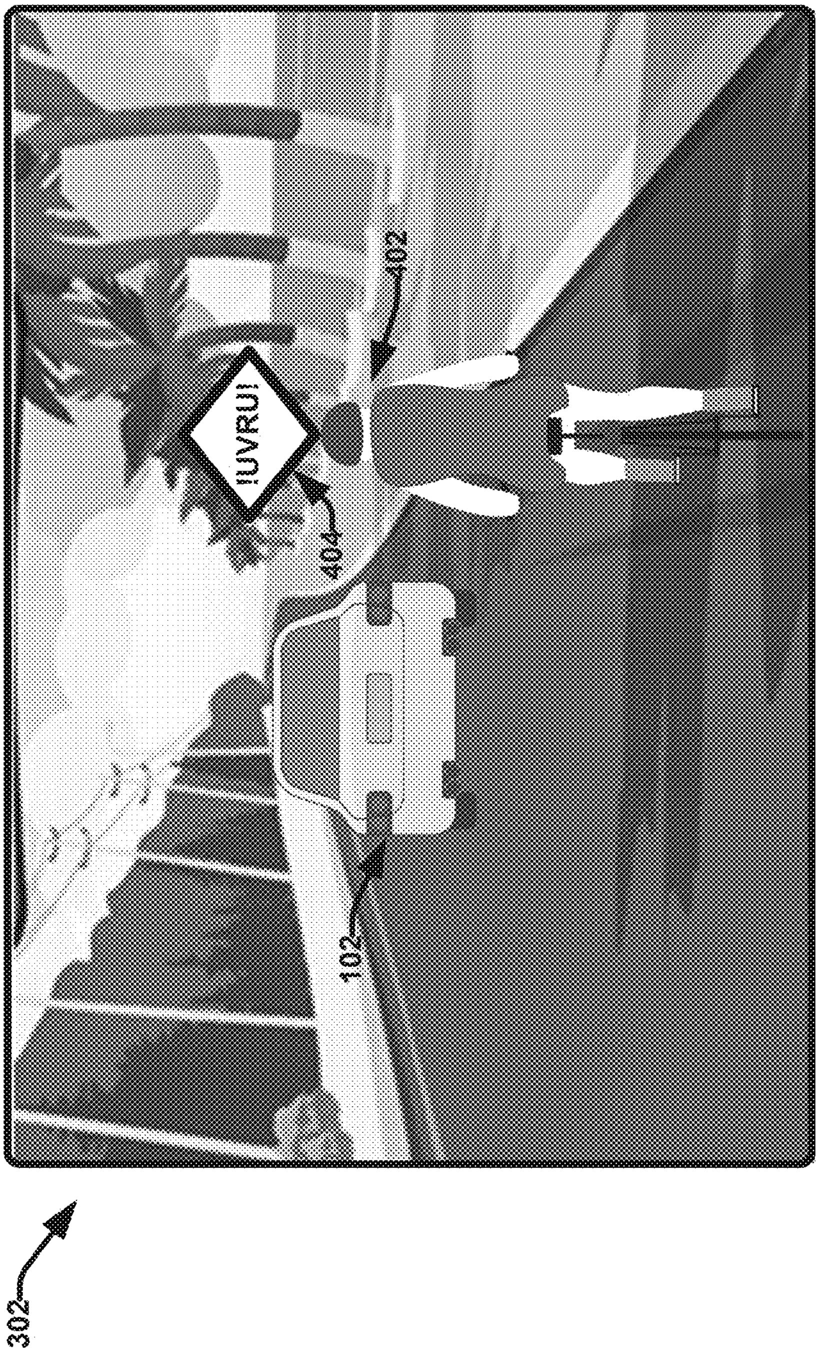
FIG. 4 illustrates an enlarged view of notification data regarding an unexpected VRU detected near a vehicle rendered via a dashboard display of the vehicle, in accordance with one or more embodiments described herein.

FIG. 4 illustrates an enlarged view of the dashboard display 302 and the notification data illustrated in FIG. 3, in accordance with one or more embodiments described herein. In accordance with this example, the notification data includes graphical image data depicting the cyclist 402 behind the vehicle 102 within the current environment of the vehicle 102. The notification data also include a graphical symbol 404 associated with the cyclist 402 that indicates the cyclist is an unexpected VRU (UVRU). It should be appreciated that the notification data illustrated in accordance with this example usage scenario is merely exemplary and that the format of the notification data and the type of information included in the notification data can vary. In this regard, the notification data is not limited to image data, and can include other forms of information (e.g., text, symbols, video data, etc.) that can be graphically displayed or displayed via another type of display device (e.g., an augmented reality display apparatus worn by the driver, or the like). The notification data can also include audible information rendered via a speaker of the vehicle regarding the detected UVRU. To this end, the notification data can include various types of information regarding a detected VRU that has been determined or inferred by the environment assessment component 204 in accordance with the techniques described above. For example, the notification data can identify or indicate whether a detected VRU is classified as expected or unexpected, indicate the expectedness probability, indicate the type of the VRU, indicate the relative position of the VRU to the vehicle 102, indicate the location of the VRU, indicate the estimated trajectory of the VRU, indicate the intersection probability, and the like.

Figure 5:
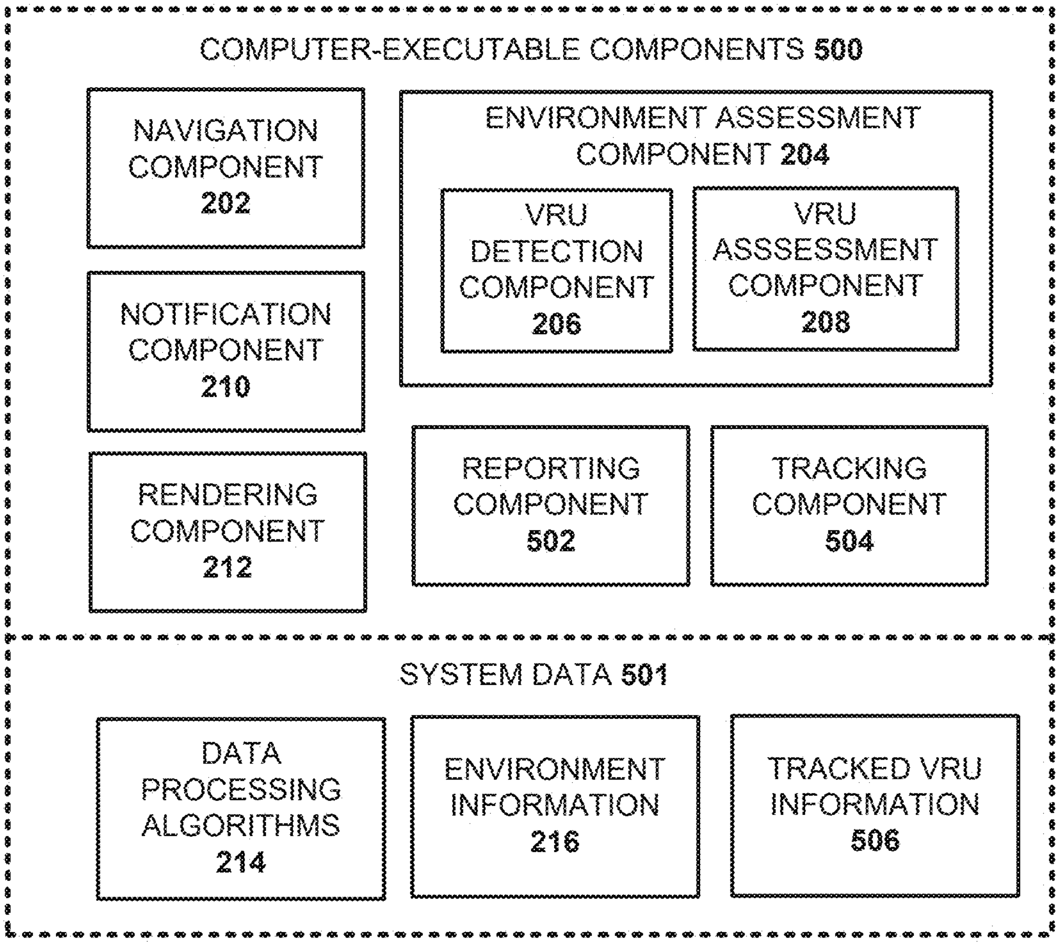
FIG. 5 illustrates additional example computer-executable components that facilitate increasing awareness of unexpected VRUs, in accordance with one or more embodiments described herein.

FIG. 5 illustrates additional example computer-executable components 500 and system data 501 that facilitate increasing awareness of unexpected VRUs, in accordance with one or more embodiments described herein. With reference to FIGS. 1-5, computer-executable components 500 and system data 501 can correspond to computer-executable components 114 and system data 116 in accordance with one or more embodiments described herein. Computer-executable components 500 and system data 501 differ from computer-executable components 200 and system data 201 with the addition of reporting component 502, tracking component 504 and tracked VRU information 506. Repetitive description of like elements employed in respective embodiments is omitted for sake of brevity.

In various embodiments, the reporting component 502 can facilitate notifying other vehicles 128 regarding VRUs detected by the VRU awareness system 104. The reporting component 104 can also receive information reported by other vehicles regarding VRUs detected by the other vehicles using VRU awareness systems corresponding to VRU awareness system 104. For example, in some embodiments, based on detection of a VRU or unexpected VRU within the current environment of the vehicle by the environment assessment component 204, the reporting component 502 can be configured to notify other vehicles within the current environment regarding the VRU using V2V communication technologies and/or V2X communication technologies. For instance, in some embodiments, the reporting component 502 can broadcast (e.g., using one or more communication connections 108) transmit (e.g., using separate notification messages sent to the respective vehicles) or otherwise provide information to other vehicles within or near the environment, area or location of the vehicle regarding the detected UVRU. For example, in some implementations, the reporting component 502 can be configured to provide information regarding the detected UVRU to only those other vehicles within a defined boundary associated with the geographical area the UVRU was detected. In another example, the reporting component 502 can be configured to provide information regarding the detected UVRU to only those other vehicles within a defined radius or distance relative to the UVRU. In another example, the reporting component 502 can be configured to provide the information regarding the detected UVRU to only those other vehicles located on or near the same road or portion of the road upon which the UVRU was detected. Still in another example, the reporting component 502 can be configured to provide information regarding the detected UVRU to only those other vehicles having a trajectory that potentially intersects with the UVRU given the direction of travel of the UVRU along the road and the direction or trajectory of travel of the other vehicles along the road.

The VRU information reported (e.g., broadcasted or otherwise provided) to the other vehicles 130 can include any of the information determined or inferred by the environment assessment component 204 regarding the detected VRU (e.g., the location of the detected VRU at the time of detection, the timing of detection of the VRU at the location, the classification of the VRU as being expected or unexpected, the expectedness probability associated with the VRU at the time of detection, the type of the VRU, the estimated trajectory of the VRU, and so on).

In some implementations, of these embodiments, the tracking component 504 can also track information (e.g., tracked VRU information 506) regarding detected VRUs as detected by the environment assessment component 208 and received from other vehicles 130 in the environment. For example, the tracking component 504 can track information regarding the location of the detected VRU at the time of detection, the timing of detection of the VRU at the location, the classification of the VRU as being expected or unexpected, the expectedness probability associated with the VRU at the time of detection, the type of the VRU, the direction of movement of the VRU and the estimated trajectory of the VRU. In some embodiments, the tracked VRU information 504 can include dynamic VRU map data that defines the roads and landscape of the environment and marks the location, type of VRU and direction of movement or trajectory of the VRU within the environment. In some embodiments, the rendering component 212 can render the dynamic VRU map data to the driver of the vehicle via an electronic display located on or within the vehicle that can be viewed by the driver and facilitate increasing awareness to the driver regarding unexpected VRUs detected within the environment.

Figure 6:
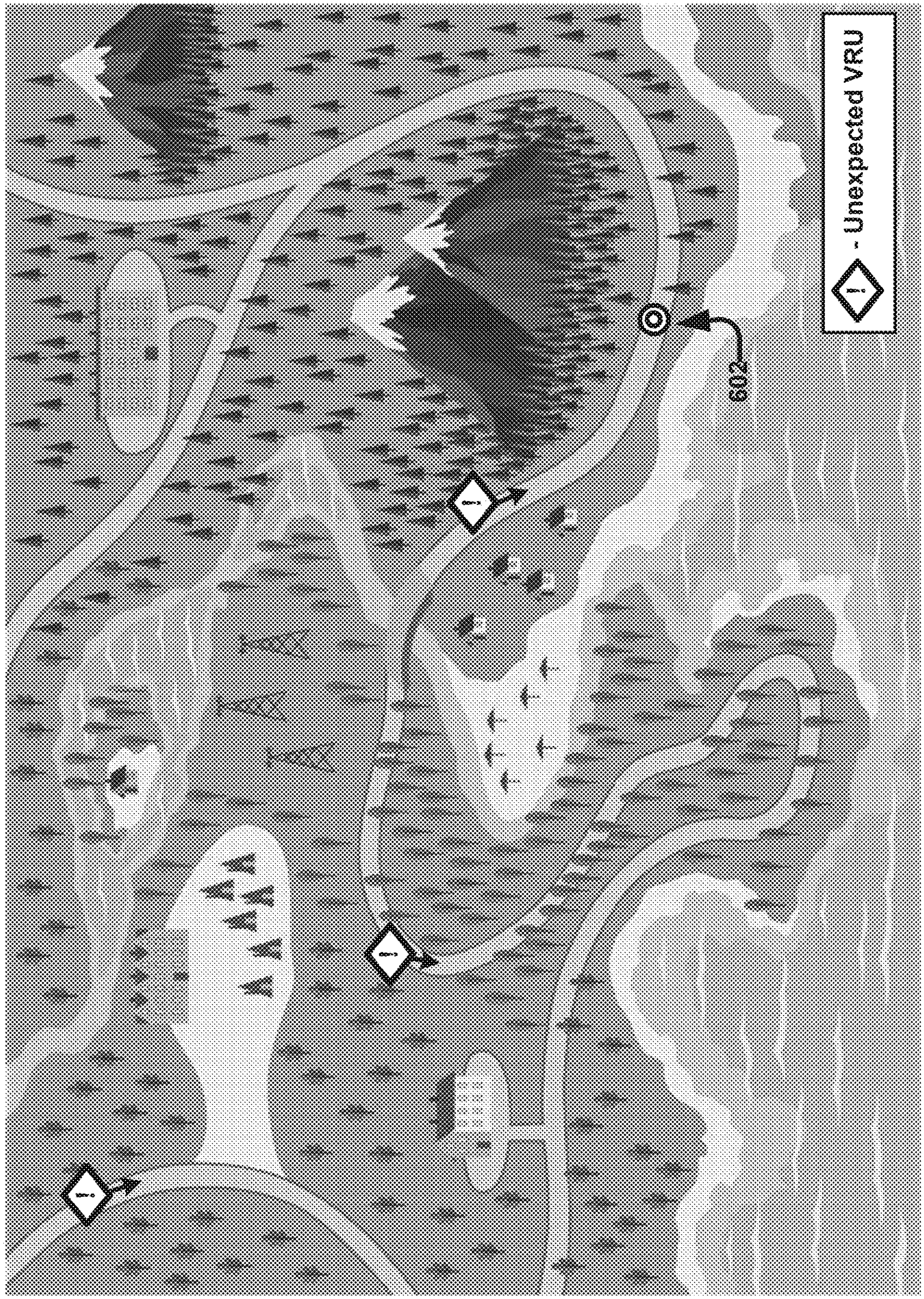
FIG. 6 illustrates an example local map visualization comprising unexpected VRU indictors in accordance with one or more embodiments described herein.

For example, with reference to FIG. 6 in view of FIGS. 1-5, FIG. 6 illustrates example dynamic VRU map data 600 that can be generated by the tracking component 504 and rendered via an electronic display located on or within the vehicle 102 in accordance with one or more embodiments described herein. In accordance with this example, the dynamic VRU map data 600 only includes information regarding reported VRUs within the environment classified as unexpected. In this regard, the dynamic VRU map data 600 includes symbols (e.g., the square symbols including the exclamation point symbol therein) representing UVRUs marking the current locations and movement directions of the detected UVRUs (as indicated via the arrow symbols extending from the square symbols). The dynamic VRU map data 600 also includes a vehicle location marker 602 that marks the current location of the vehicle 102 within the environment.

In some embodiments, the tracking component 504 can also dynamically update the dynamic VRU map data in real-time to reflect changes to the detected VRUs location as the move about the environment and/or are not longer present within the environment. To facilitate this end, in some embodiments, based on information indicating the location of a VRU at the time at which the VRU is detected, the type of the VRU, the trajectory of the VRU, the speed of the VRU and the known information about the roads and paths of the environment along with the VRU can travel, the tracking component 504 can estimate changes to the location of the VRU within the environment over time and update the dynamic map information accordingly.

In addition, the tracking component 504 can employ received information from other vehicles in the area over time in different locations throughout the environment regarding detection of the same VRU in association with updating the current location of the same VRU in the tracked VRU information 506. To facilitate this end, in some embodiments, in association with reporting a detected VRU, the VRU assessment component 208 (and the VRU assessment components of the other vehicles) can generate a unique identifier for the VRU that uniquely identifies the VRU based on image data and/or sensor data captured of the VRU and include the unique identifier in the reported VRU information. Importantly, the mechanism via which the respective VRU assessment components 208 of participating vehicles (e.g., those vehicles employing a VRU awareness system 104 incorporating reporting component 502 and tracking component 504) generate unique identifiers (e.g., unique data signatures or fingerprints) for detected VRUs based on the captured image and/or sensor data of the VRU can be controlled such that unique identifiers generated for the same VRU by different VRU assessment components 208 are the same or substantially the same (e.g., relative to a defined measure of similarity).

For example, in some embodiments, the VRU assessment component 208 can employ facial recognition technology in implementations in which the image data captured of the VRU includes facial image data of the pedestrian or a person otherwise driving or riding the VRU vehicle. With these embodiments, the VRU assessment component 208 can generate a unique facial signature for the detected VRU which can be associated with the information tracked and reported for the VRU. In another embodiment, the unique VRU identifier (signature or fingerprint) can be generated based on non-facial image data for the VRU, such as image data of the body and/or clothing of the pedestrian, unique gesture/gate information, unique image data of the VRU vehicle (e.g., a bicycled, a scooter, a skateboard, a horse, a golf-cart, etc.). Accordingly, when a new vehicle that encounters a VRU that has already been reported and included in the tracked VRU information 506 as determined based on comparison of the unique identifier associated with the VRU in the tracked VRU information and a newly generated version of the unique identifier for the VRU by the new vehicle, the tracking component 504 can determine whether the detected VRU corresponds to a previously detected VRU within the environment (e.g., based on the respective identifiers matching or substantially matching in accordance with a defined similarity requirement). The tracking component 504 of the new vehicle can further update the current location of the same VRU (and other new information about the VRUs trajectory, speed, etc.) in the new vehicles tracked VRU information 506 and report the updated VRU location and trajectory information to the other vehicles in the area.

Additionally or alternatively, the reporting component 502 can be configured to report information regarding VRUs detected within the environment (e.g., any of the information described above, including the unique VRU identifiers) regarding detected VRUs to a network accessible VRU tracking system (e.g., included amongst the other external systems/devices 130), which can be accessed by the VRU awareness system 104 and respective VRU awareness systems of the other vehicles in real-time using V2X communication technologies. With these embodiments, the network accessible VRU tracking system can perform same or similar VRU tracking functions as the local tracking components of the respective vehicles (e.g., corresponding to tracking component 504) described above based on aggregated VRU information received from the respective vehicles. For example, the VRU tracking system can generate and update dynamic VRU map data for the environment that indicates the current locations of VRU detected within an area and indicates the trajectory or direction of movement of the detected VRU as updated in real-time as information is reported and received from the respective vehicles. In this regard, the VRU tracking system can regularly or continuously update the dynamic VRU map information to reflect changes to locations and trajectories of detected VRUs within the environment based on reception of newly received information regarding the VRUs as they are encountered and detected by other vehicles in the area. With these embodiments, tracking component 504 of the respective vehicles can access the dynamic VRU map information from the network accessible VRU tracking system and the rendering component 212 can render the updates to the dynamic VRU map information as they are generated. For example, the tracking component 504 of a particular vehicle can access the dynamic VRU map information for the particular environment, route, location or road being traveled by the vehicle to determine relevant information regarding VRU detected within or near the vehicles current environment, route, location, road etc. In this manner, as VRUs are detected within an environment by different vehicles throughout the environment, the respective VRU awareness systems of the vehicles can operate in a crowd-source manner to aggregate information regarding detected VRUs within the area.

In addition, the VRU assessment component 208 can employ the dynamic VRU map information in association with detecting unexpected VRUs that the vehicle is likely to encounter given the known location and route of the vehicle 102 and the known locations and trajectories of VRUs within the environment. More particularly, the VRU assessment component 208 can determine whether and when the vehicle will encounter the unexpected VRU in the upcoming future, and the notification component 210 can generate notification warning to the same in advance (e.g., prior to the vehicle being located within detectable vicinity of the vehicle capable being detected based image and/or sensor data capture by the one or more cameras 120 and/or sensors 120 onboard the vehicle 102). In addition, based on dynamic VRU map data indicating a location of a VRU is positioned along a current route of the vehicle 102, the VRU assessment component 208 can determine, based on the speed route and trajectory of the vehicle and information regarding the location, speed, and/or trajectory of the VRU, an estimated time in the future at which the vehicle is expected to be within a defined distance relative to the VRU, wherein the defined distance corresponds to a FOV of the one or more cameras 120 and/or a sensing distance capacity of the one or more sensors 122. In some implementations of these embodiments, the VRU assessment component 208 can further control activation and deactivation of the respective cameras and sensors and/or activation and deactivation of the VRU detection component 206 (e.g., to perform processing of the captured image/sensor data for VRU detection) in a manner such that the cameras/sensors and/or the VRU detection component 206 are only activated for VRU detection at times when the vehicle is in the vicinity of a previously detected VRU reported by one or more other vehicles (thereby conserving power and computational resources used for the camera/sensor activation and the VRU detection component 206 processing).

Figure 7:
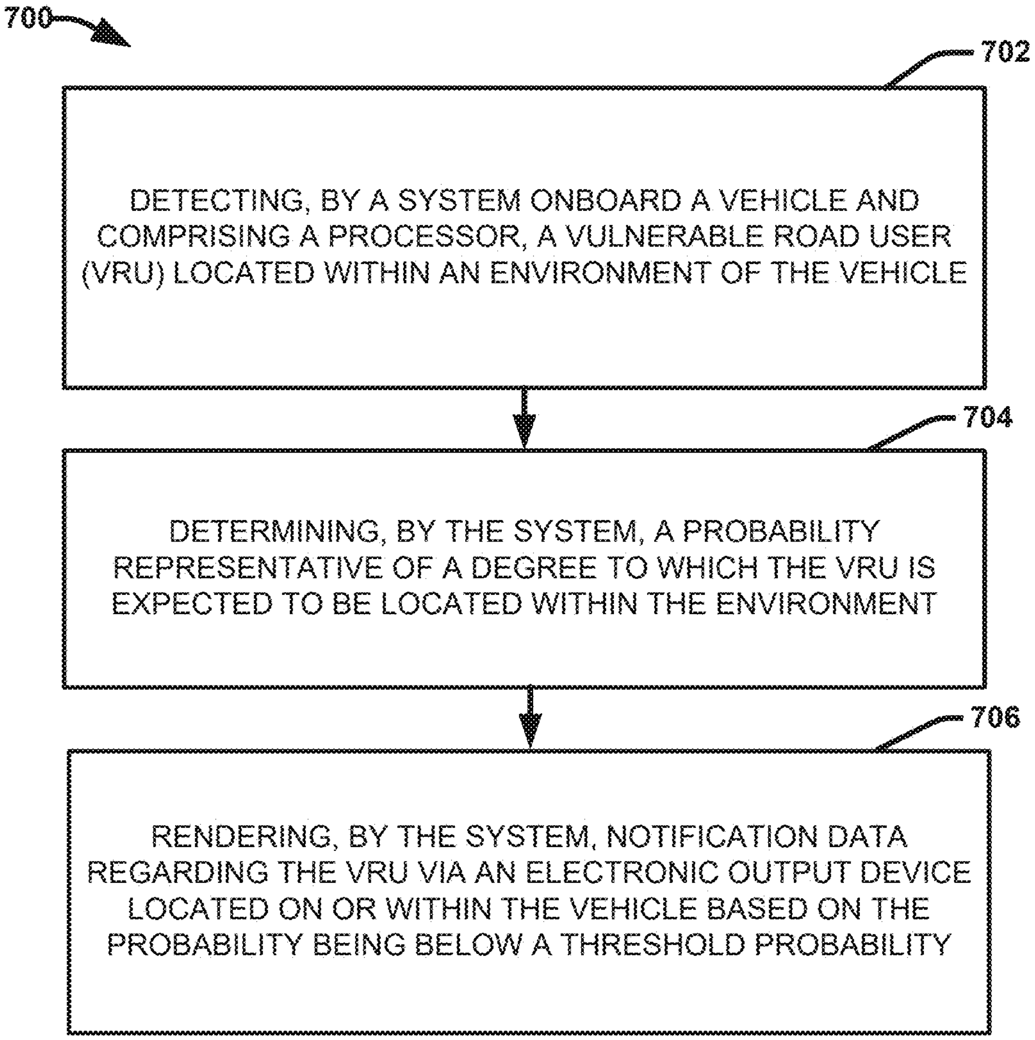
FIG. 7 illustrates a block flow diagram of an example, non-limiting computer-implemented method for increasing awareness of unexpected VRUs, in accordance with one or more embodiments described herein.

FIG. 7 illustrates a block flow diagram of an example, non-limiting computer-implemented method 700 for increasing awareness of unexpected VRUs, in accordance with one or more embodiments described herein. With reference to FIG. 7 in view of FIGS. 1-6, at 702 method 700 comprises detecting, by a system onboard a vehicle and comprising a processor (e.g., VRU awareness system 104), VRU located within an environment of the vehicle (e.g., via VRU detection component 206). At 704, method 700 comprises determining, by the system, a probability representative of a degree to which the VRU is expected to be located within the environment (e.g., via VRU assessment component 208). At 706, method 700 comprises rendering, by the system, notification data regarding the VRU via an electronic output device located on or within the vehicle based on the probability being below a threshold probability (e.g., via notification component 210 and rendering component 212).

Figure 8:
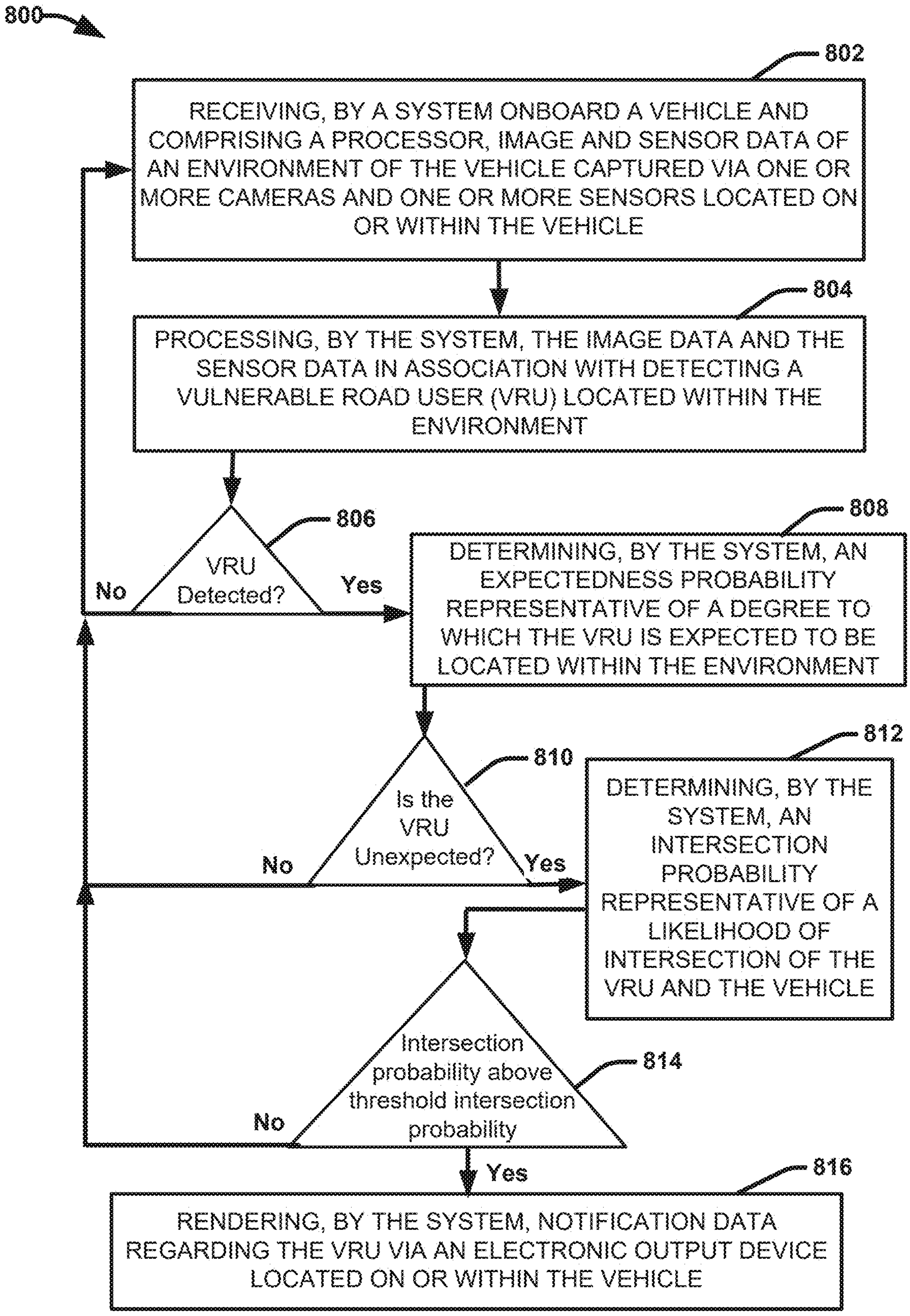
FIG. 8 illustrates a block flow diagram of another example, non-limiting computer-implemented method for increasing awareness of unexpected VRUs, in accordance with one or more embodiments described herein.

FIG. 8 illustrates a block flow diagram of another example, non-limiting computer-implemented method 800 for increasing awareness of unexpected VRUs, in accordance with one or more embodiments described herein. With reference to FIG. 8 in view of FIGS. 1-6, at 802, method 800 comprises receiving, by a system onboard a vehicle and comprising a processor (e.g., VRU awareness system 104), image data and sensor data of an environment of the vehicle captured via one or more cameras located on or within the vehicle (e.g., via environment assessment component 204). At 804, method 800 comprises processing, by the system, the image data and the sensor data in association with detecting a VRU located within the environment (e.g., via environment assessment component 204 and one or more data processing algorithms 214). At 806, the system determines whether a VRU is detected or not (e.g., via VRU detection component 206 based on the results of the one or more data processing algorithms 214). If not, then process 800 reverts back to 802. If a VRU is detected, then process 800 continues to 808, wherein the system determines an expectedness probability representative of a degree to which the VRU is expected to be located within the environment (e.g., via VRU assessment component 208). At 810, the system determines whether the detected VRU is expected or not (e.g., based on comparison of the expectedness probability to a threshold expectedness probability for the location/environment). If at 810 the system determines that the VRU is expected, then process 800 proceeds back to 802. If at 810 the system determines that the VRU is unexpected, the process 800 continues to 812 wherein the system determines an intersection probability representative of a likelihood of intersection of the VRU and the vehicle (e.g., via the VRU assessment component 208). At 814, the system determines whether the intersection probability is above a threshold intersection probability, and if not, then process 800 reverts back to 802. However, if at 814 the intersection probability is determined to be above the threshold, then process 800 continues to 816 wherein the system renders notification data regarding the VRU via an electronic output device located on or within the vehicle (e.g., via notification component 210 and rendering component 212).

Figure 9:
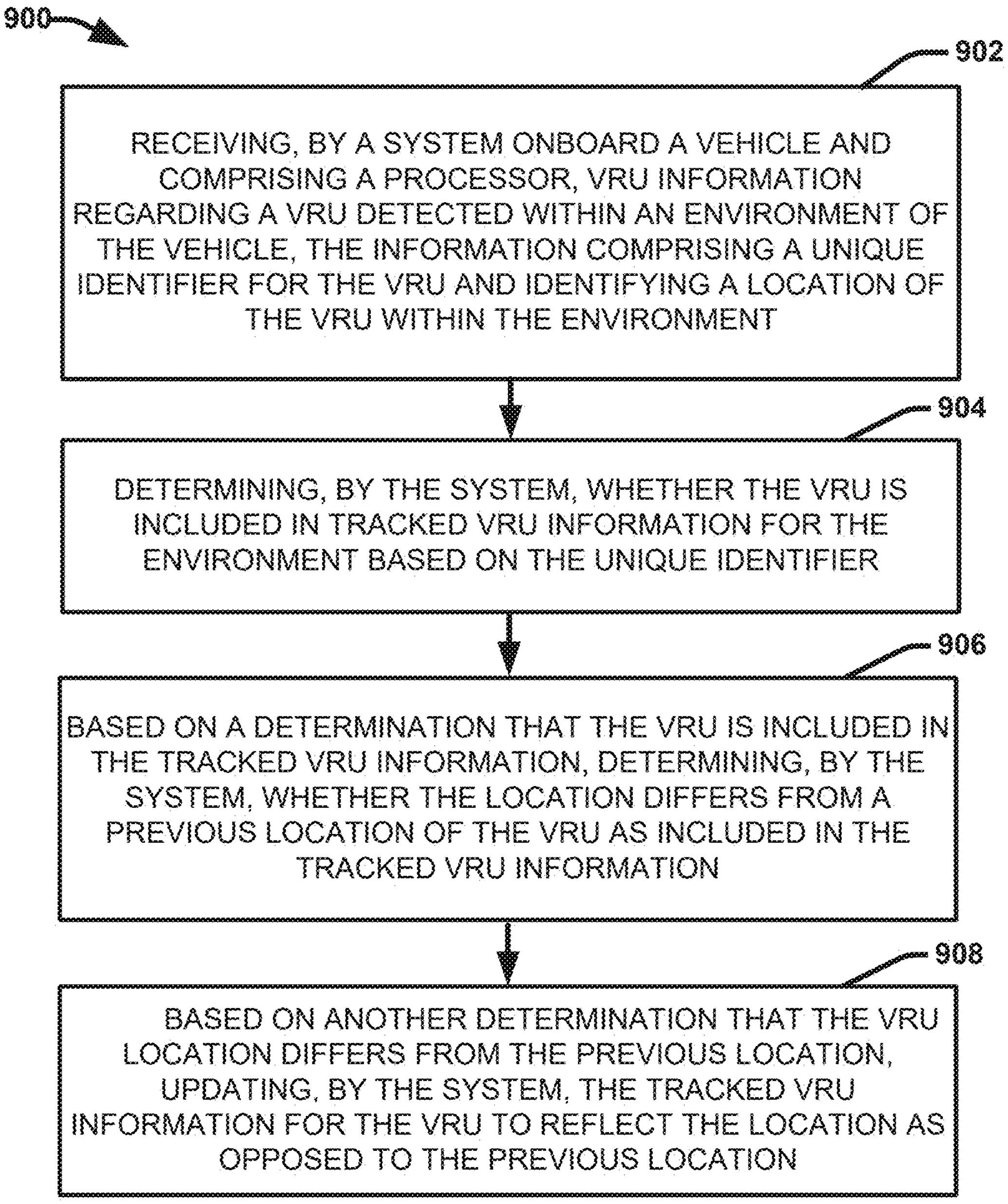
FIG. 9 illustrates a block flow diagram of another example, non-limiting computer-implemented method for increasing awareness of unexpected VRUs, in accordance with one or more embodiments described herein.

FIG. 9 illustrates a block flow diagram of another example, non-limiting computer-implemented method 900 for increasing awareness of unexpected VRUs, in accordance with one or more embodiments described herein. With reference to FIG. 9 in view of FIGS. 1-6, at 902 method 900 comprises receiving (e.g., via reporting component 502), by a system onboard a vehicle and comprising a processor (e.g., VRU awareness system 104), VRU information regarding a VRU detected within an environment of the vehicle, the information comprising a unique identifier for the VRU and identifying a location of the VRU within the environment. At 904, method 900 comprises determining, by the system, whether the VRU is included in tracked VRU information for the environment based on the unique identifier (e.g., via tracking component 502). For example, the tracking component 504 can scan the tracked VRU information and determine whether the same VRU has already been reported/detected and included in the tracked VRU information 506 based on whether a VRU included in the tracked VRU information has the corresponding unique identifier. At 906, based on a determination that the VRU is included in the tracked VRU information method 900 further comprises, determining, by the system, whether the location differs from a previous location of the VRU as included in the tracked VRU information (e.g., via the tracking component 504). At 908, based on another determination that the VRU location differs from the previous location, updating, by the system, the tracked VRU information for the VRU to reflect the location as opposed to the previous location (e.g., by the tracking component).

One or more embodiments can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. To this end, a computer readable storage medium, a machine-readable storage medium, or the like as used herein can include a non-transitory computer readable storage medium, a non-transitory machine-readable storage medium, and the like.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 12, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 10:
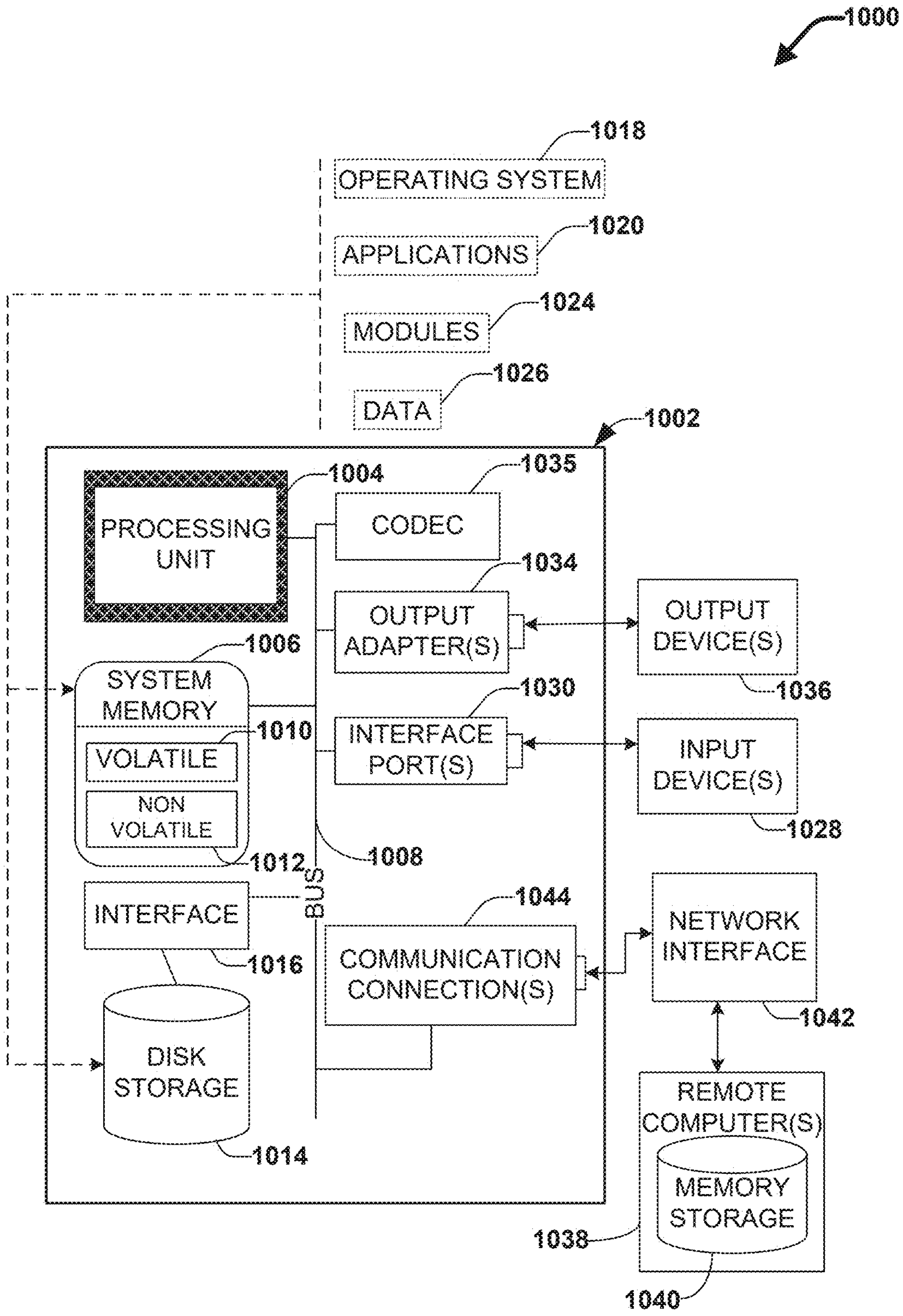
FIG. 10 is an example, non-limiting computing environment in which one or more embodiments described herein can be implemented.

With reference to FIG. 10, an example environment 1000 for implementing various aspects of the claimed subject matter includes a computer 1002. The computer 1002 includes a processing unit 1004, a system memory 1006, a codec 1035, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1384), and Small Computer Systems Interface (SCSI).

The system memory 1006 includes volatile memory 1010 and non-volatile memory 1012, which can employ one or more of the disclosed memory architectures, in various embodiments. The basic input/output system (BIOS), containing the basic routines to transfer information between elements within the computer 1002, such as during start-up, is stored in non-volatile memory 1012. In addition, according to present innovations, codec 1035 can include at least one of an encoder or decoder, wherein the at least one of an encoder or decoder can consist of hardware, software, or a combination of hardware and software. Although, codec 1035 is depicted as a separate component, codec 1035 can be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 1012 can employ one or more of the disclosed memory devices, in at least some embodiments. Moreover, non-volatile memory 1012 can be computer memory (e.g., physically integrated with computer 1002 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1010 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1002 can also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD), flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1014 to the system bus 1008, a removable or non-removable interface is typically used, such as interface 1016. It is appreciated that disk storage 1014 can store information related to a user. Such information might be stored at or provided to a server or to an application running on a user device. In one embodiment, the user can be notified (e.g., by way of output device(s) 1036) of the types of information that are stored to disk storage 1014 or transmitted to the server or application. The user can be provided the opportunity to opt-in or opt-out of having such information collected or shared with the server or application (e.g., by way of input from input device(s) 1028).

It is to be appreciated that FIG. 10 describes software that acts as an intermediary between users and the basic computer resources described in the suitable operating environment 1000. Such software includes an operating system 1010. Operating system 1010, which can be stored on disk storage 1014, acts to control and allocate resources of the computer 1002. Applications 1020 take advantage of the management of resources by operating system 1010 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, touchscreen, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port can be used to provide input to computer 1002 and to output information from computer 1002 to an output device 1036. Output adapter 1034 is provided to illustrate that there are some output devices 1036 like monitors/displays, speakers, and printers, among other output devices 1036, which require special adapters. The output adapters 1034 include, by way of illustration and not limitation, video and sound cards that provide a means of connection between the output device 1036 and the system bus 1008. It should be noted that other devices or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, an onboard vehicle computer, a communication device (e.g., a mobile phone, a smartphone, a smartwatch, a wearable device, etc.), a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

It is to be noted that aspects or features of this disclosure can be exploited in substantially any wireless telecommunication or radio technology, e.g., Wi-Fi; Bluetooth; Worldwide Interoperability for Microwave Access (WiMAX); Dedicated Short-Range Communications (DSRC); ITS-G5; Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); 4GPP; 5GPP; High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); non-terrestrial networks (e.g., satellite); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

Figure 11:
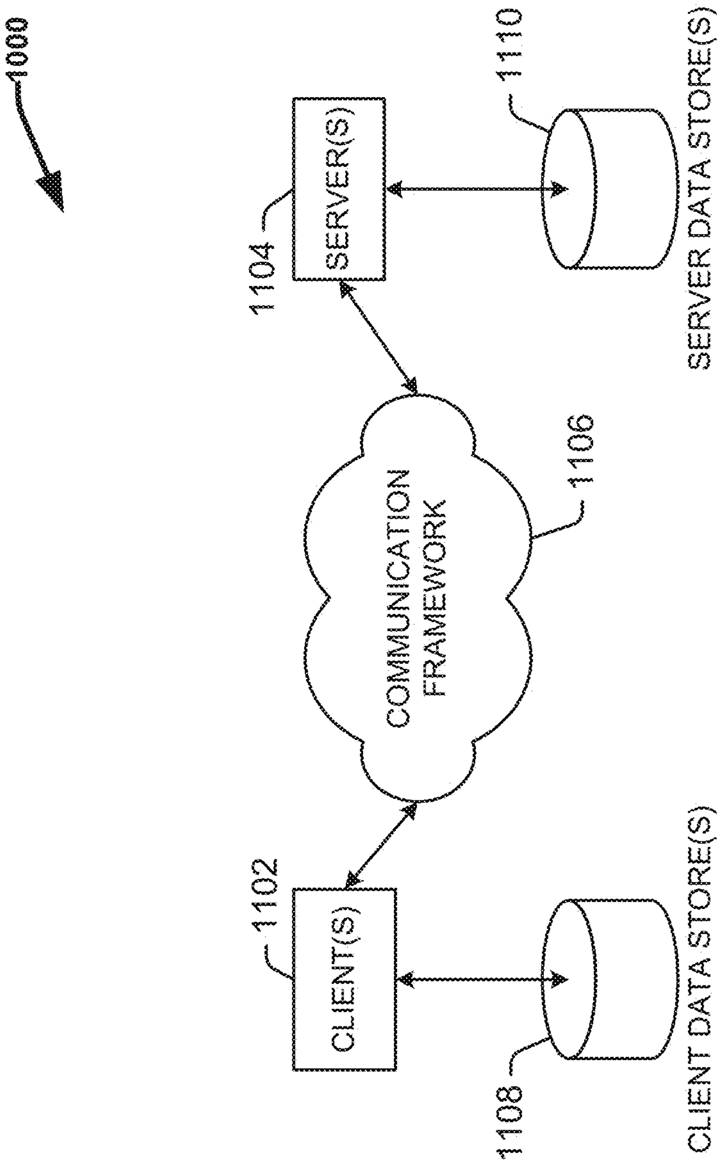
FIG. 11 is an example, non-limiting networking environment in which one or more embodiments described herein can be implemented.

Referring now to FIG. 11, there is illustrated a schematic block diagram of a computing environment 1100 in accordance with this specification. The system 1100 includes one or more client(s) 1102, (e.g., computers, smart phones, tablets, cameras, PDA's). The client(s) 1102 can be hardware and/or software (e.g., threads, processes, computing devices). The client(s) 1102 can house cookie(s) and/or associated contextual information by employing the specification, for example.

The system 1100 also includes one or more server(s) 1104. The server(s) 1104 can also be hardware or hardware in combination with software (e.g., threads, processes, computing devices). The servers 1104 can house threads to perform transformations of media items by employing aspects of this disclosure, for example. One possible communication between a client 1102 and a server 1104 can be in the form of a data packet adapted to be transmitted between two or more computer processes wherein data packets may include coded analyzed headspaces and/or input. The data packet can include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104. Further, the client(s) 1102 can be operatively connected to one or more server data store(s) 1110.

In one exemplary implementation, a client 1102 can transfer an encoded file, (e.g., encoded media item), to server 1104. Server 1104 can store the file, decode the file, or transmit the file to another client 1102. It is noted that a client 1102 can also transfer uncompressed file to a server 1104 and server 1104 can compress the file and/or transform the file in accordance with this disclosure. Likewise, server 1104 can encode information and transmit the information via communication framework 1106 to one or more clients 1102.

The illustrated aspects of the disclosure can also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature can be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further aspects of the invention are provided by the subject matter of the following clauses:

1. A system onboard a vehicle, comprising:
   a memory that stores computer executable components; and
   a processor that executes the computer executable components stored in the memory, wherein the computer executable components comprise:
      a detection component that detects a vulnerable road user (VRU) located within an environment of the vehicle;
      an assessment component that determines a probability representative of a degree to which the VRU is expected to be located within the environment; and
      a notification component that renders notification data regarding the VRU via an electronic output device located on or within the vehicle based on the probability being below a threshold probability.
2. The system of clause 1, wherein the VRU assessment component classifies the VRU as being unexpected as opposed to expected based on the probability being below the threshold probability, and wherein the notification component prevents rendering notifications regarding VRUs detected by the detection component that are classified as expected by the VRU assessment component.
3. The system of clause 2, wherein the notification data identifies the VRU as being classified as unexpected.
4. The system of clause 3, wherein the notification data identifies a location of the VRU.
5. The system of clause 4, wherein the VRU assessment component determines VRU information regarding a type of the VRU and a trajectory of the VRU and wherein the notification data comprises the information.
6. The system of clause 5, wherein the computer-executable components further comprise:
   a tracking component that tracks unexpected VRU information regarding VRUs detected within the environment and classified as unexpected, wherein the unexpected VRU information comprises the VRU information.
7. The system of clause 1, wherein the computer-executable components further comprise a reporting component that notifies one or more other vehicles located within the environment regarding the VRU based on the probability being below the threshold probability.
8. The system of clause 1, wherein the VRU assessment component determines the probability based on classification information associated with the environment indicating the probability.
9. The system of clause 1, wherein the environment comprises a road via which the vehicle is currently being driven, and wherein the VRU assessment component determines the probability based on classification information associated with the road indicating the probability.

10. The system of clause 9, wherein the VRU assessment component further determines the probability based on a type of the VRU and a time at which the VRU is detected by the detection component.

11. The system of clause 9, wherein the VRU assessment component further determines a measure of likelihood of the vehicle intersecting with the VRU based on a position of the VRU relative to the vehicle, a vehicle trajectory of the vehicle, and a VRU trajectory of the VRU, and wherein the notification component renders the notification data based on the measure being above a threshold measure.

The system of clause 1 above with any set of combinations of the systems of clauses 2-11 above.

12. A method, comprising:

detecting, by a system onboard a vehicle and comprising a processor, a vulnerable road user (VRU) located within an environment of the vehicle;

determining, by the system, a probability representative of a degree to which the VRU is expected to be located within the environment; and rendering, by the system, notification data regarding the VRU via an electronic output device located on or within the vehicle based on the probability being below a threshold probability.

13. The method of clause 12, further comprising:

classifying, by the system, the VRU as being unexpected as opposed to expected based on the probability being below the threshold probability, wherein the notification data identifies the VRU as being classified as unexpected; and preventing, by the system, rendering of notifications regarding VRUs detected by the system and classified as expected.

14. The method of clause 13, further comprising:

determining, by the system, VRU information regarding a location of the VRU, a type of the VRU and a trajectory of the VRU, and wherein the notification data comprises the VRU information.

15. The method of clause 14, further comprising:

tracking, by the system, unexpected VRU information regarding VRUs detected within the environment and classified as unexpected, wherein the unexpected VRU comprises the VRU information.

16. The method of clause 12, further comprising:

notifying, by the system, one or more other vehicles located within the environment regarding the VRU based on the probability being below the threshold probability.

17. The method of clause 12, wherein determining the probability comprises determining the probability based on classification information associated with the environment indicating the probability.

18. The method of clause 12, wherein the environment comprises a road via which the vehicle is currently being driven, and wherein determining the probability comprises determining the probability based on classification information associated with the road indicating the probability, a type of the VRU and a time at which the VRU is detected.

The method of clause 12 above with any set of combinations of the methods of clauses 13-18 above.

19. A non-transitory machine-readable storage medium, comprising executable instructions that, when executed by a processor onboard a vehicle, facilitate performance of operations, comprising:

detecting a vulnerable road user (VRU) located within an environment of the vehicle;

determining a probability representative of a degree to which the VRU is expected to be located within the environment; and rendering notification data regarding the VRU via an electronic output device located on or within the vehicle based on the probability being below a threshold probability.

20. The non-transitory machine-readable storage medium of clause 19, wherein the operations further comprise: further comprising:

classifying the VRU as being unexpected as opposed to expected based on the probability being below the threshold probability, wherein the notification data identifies the VRU as being classified as unexpected; and preventing rendering of notifications by the system regarding VRUs detected by the system and classified as expected.

What is claimed is:

1. A system onboard a vehicle, comprising:

a non-transitory memory that stores computer executable components; and a processor that executes at least one of the computer executable components that:

detects a vulnerable road user (VRU) located within an environment of the vehicle;

classifies an environment type of the environment from a group of environment types comprising a rural environment type and an urban environment type;

determines, based on the environment type, a probability representative of a degree to which the VRU would have been expected to be located within the environment; and renders notification data regarding the VRU via an electronic output device located on or within the vehicle based on the probability being below a threshold probability.

2. The system of claim 1, wherein the at least one of the computer executable components further:

classifies the VRU as being unexpected as opposed to expected based on the probability being below the threshold probability; and prevents rendering notifications regarding VRUs detected.

3. The system of claim 2, wherein the notification data identifies the VRU as being classified as unexpected.

4. The system of claim 3, wherein the notification data identifies a location of the VRU.

5. The system of claim 4, wherein the at least one of the computer executable components further:

determines VRU information regarding a type of the VRU and a trajectory of the VRU, and wherein the notification data comprises the VRU information.

6. The system of claim 5, wherein the at least one of the computer executable components further:

tracks unexpected VRU information regarding VRUs detected within the environment and classified as unexpected, wherein the unexpected VRU information comprises the VRU information.

7. The system of claim 1, wherein the at least one of the computer executable components further:

notifies one or more other vehicles located within the environment regarding the VRU based on the probability being below the threshold probability.

8. The system of claim 1, wherein the at least one of the computer executable components further:

determines the probability based on classification information associated with the environment indicating the probability.

9. The system of claim 1, wherein the environment comprises a road via which the vehicle is currently being driven, and wherein the at least one of the computer executable components further:

determines the probability based on classification information associated with the road indicating the probability.

10. The system of claim 9, wherein the at least one of the computer executable components further:

determines the probability based on a type of the VRU and a time at which the VRU is detected.

11. The system of claim 9, wherein the at least one of the computer executable components further:

determines a measure of likelihood of the vehicle intersecting with the VRU based on a position of the VRU relative to the vehicle, a vehicle trajectory of the vehicle, and a VRU trajectory of the VRU; and renders the notification data based on the measure being above a threshold measure.

12. A method, comprising:

detecting, by a system onboard a vehicle and comprising a processor, a vulnerable road user (VRU) located within an environment of the vehicle;

classifying, by the system, an environment type of the environment from a group of environment types comprising a rural environment type and an urban environment type;

determining, by the system, based on the environment type, a probability representative of a degree to which the VRU would have been expected to be located within the environment; and rendering, by the system, notification data regarding the VRU via an electronic output device located on or within the vehicle based on the probability being below a threshold probability.

13. The method of claim 12, further comprising:

classifying, by the system, the VRU as being unexpected as opposed to expected based on the probability being below the threshold probability, wherein the notification data identifies the VRU as being classified as unexpected; and preventing, by the system, rendering of notifications regarding VRUs detected by the system and classified as expected.

14. The method of claim 13, further comprising:

determining, by the system, VRU information regarding a location of the VRU, a type of the VRU and a trajectory of the VRU, and wherein the notification data comprises the VRU information.

15. The method of claim 14, further comprising:

tracking, by the system, unexpected VRU information regarding VRUs detected within the environment and classified as unexpected, wherein the unexpected VRU information comprises the VRU information.

16. The method of claim 12, further comprising:

notifying, by the system, one or more other vehicles located within the environment regarding the VRU based on the probability being below the threshold probability.

17. The method of claim 12, wherein determining the probability comprises determining the probability based on classification information associated with the environment indicating the probability.

18. The method of claim 12, wherein the environment comprises a road via which the vehicle is currently being driven, and wherein determining the probability comprises determining the probability based on classification information associated with the road indicating the probability, a type of the VRU and a time at which the VRU is detected.

19. A non-transitory machine-readable storage medium, comprising executable instructions that, when executed by a processor onboard a vehicle, facilitate performance of operations, comprising:

detecting a vulnerable road user (VRU) located within an environment of the vehicle;

classifying an environment type of the environment from a group of environment types comprising a rural environment type and an urban environment type;

determining, based on the environment type, a probability representative of a degree to which the VRU would have been expected to be located within the environment; and rendering notification data regarding the VRU via an electronic output device located on or within the vehicle based on the probability being below a threshold probability.

20. The non-transitory machine-readable storage medium of claim 19, wherein the operations further comprise: further comprising:

classifying the VRU as being unexpected as opposed to expected based on the probability being below the threshold probability, wherein the notification data identifies the VRU as being classified as unexpected; and preventing rendering of notifications by the system regarding VRUs detected by the system and classified as expected.

* * * * *